(12) United States Patent
Malaviya et al.

(10) Patent No.: US 6,477,520 B1
(45) Date of Patent: Nov. 5, 2002

(54) ADAPTIVE TRAVEL PURCHASING OPTIMIZATION SYSTEM

(75) Inventors: Ashutosh Malaviya; Paritosh Malaviya, both of Eden Prairie; Praful Saklani; Mukul Saklani, both of Chaska, all of MN (US)

(73) Assignee: Yatra Corporation, Minneapolis, MN (US)

( * ) Notice: Subject to any disclaimer, the term of this patent is extended or adjusted under 35 U.S.C. 154(b) by 0 days.

(21) Appl. No.: 09/255,178

(22) Filed: Feb. 22, 1999

(51) Int. Cl.[7] ................................................ G06N 7/02
(52) U.S. Cl. ........................ 706/47; 704/8; 706/25; 706/58
(58) Field of Search .................... 704/8; 706/2, 13, 706/25, 47, 58

(56) References Cited

U.S. PATENT DOCUMENTS

| 4,763,277 A | * | 8/1988 | Ashford et al. ............... 706/47 |
| 4,914,590 A | * | 4/1990 | Loatman et al. ............... 704/8 |
| 5,222,197 A | * | 6/1993 | Teng et al. .................... 706/58 |
| 5,331,546 A |   | 7/1994 | Webber et al. |
| 5,524,176 A | * | 6/1996 | Narita et al. ................... 706/2 |
| 5,649,066 A | * | 7/1997 | Larcher ........................ 706/25 |
| 5,832,453 A |   | 11/1998 | O'Brien ......................... 705/6 |
| 5,852,814 A | * | 12/1998 | Bradley ......................... 706/13 |

* cited by examiner

*Primary Examiner*—Wilbert L. Starks, Jr.
(74) *Attorney, Agent, or Firm*—George A. Leone

(57) ABSTRACT

A travel purchasing optimization system consists of a cognizer in communication with a knowledge base and a rule base. A knowledge acquisition and rule manager (KARM) dynamically creates, alters, and adaptively fine tunes rules for the rule base from existing business knowledge using a rule modeling language. A travel request is made through an external booking system and sent to the cognizer via an integration framework and the knowledge base. The integration framework pools data from a series of external systems or databases and the cognizer compares the rules from the rule base with the pooled data from the integration framework. The cognizer generates the total cost of travel (TCOT) and sends the TCOT back to the external booking system via the integration framework.

18 Claims, 17 Drawing Sheets

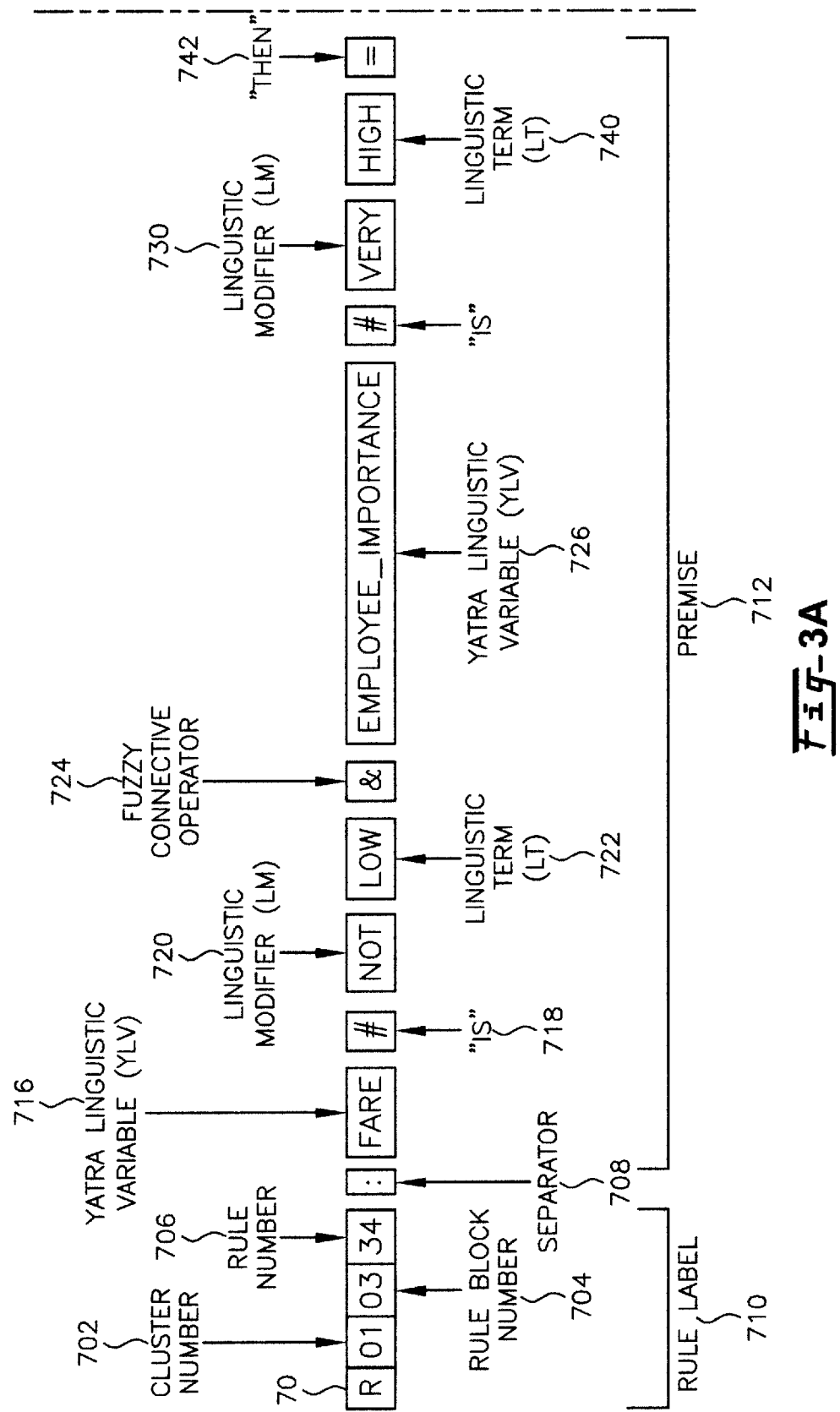

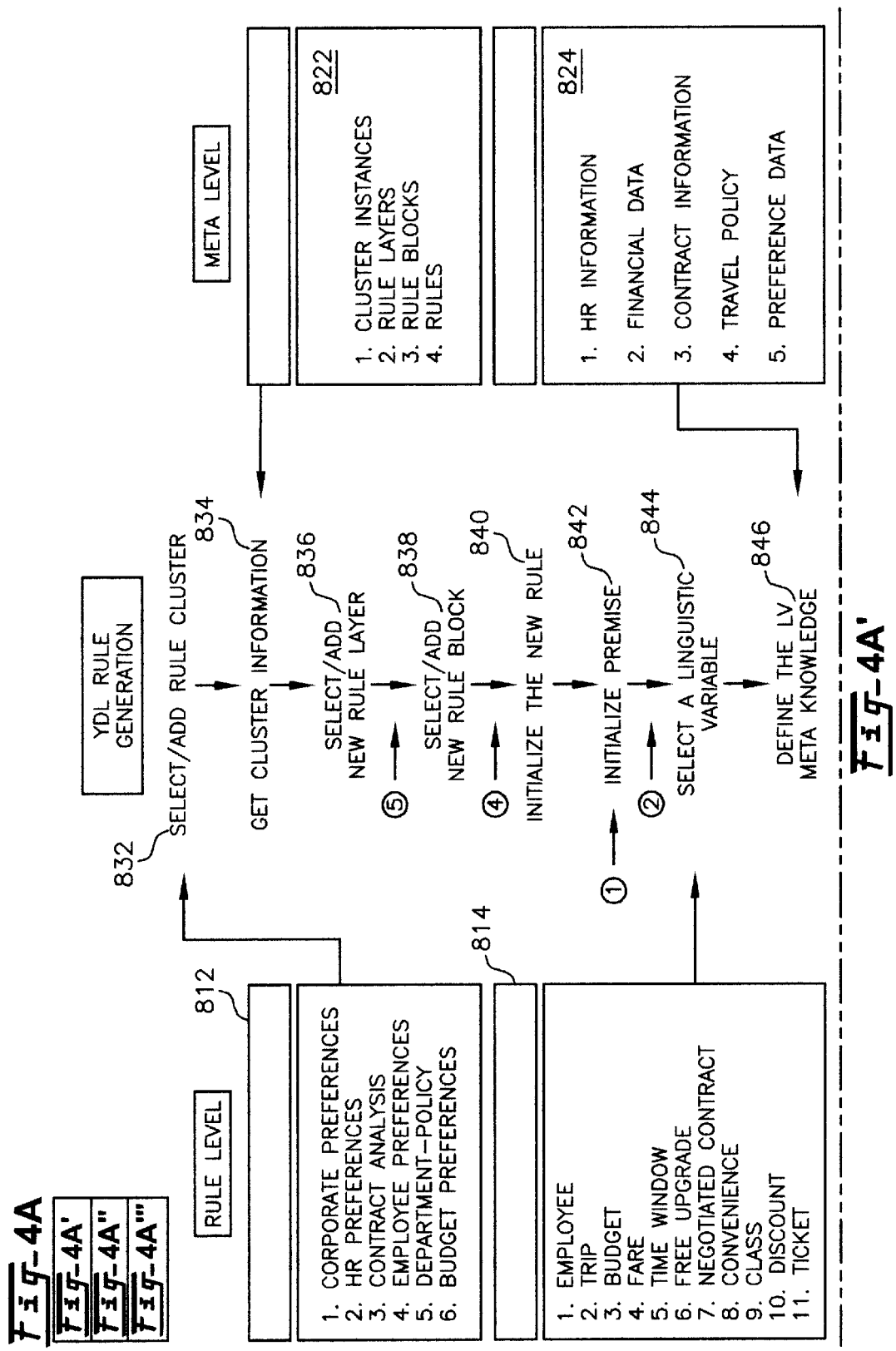

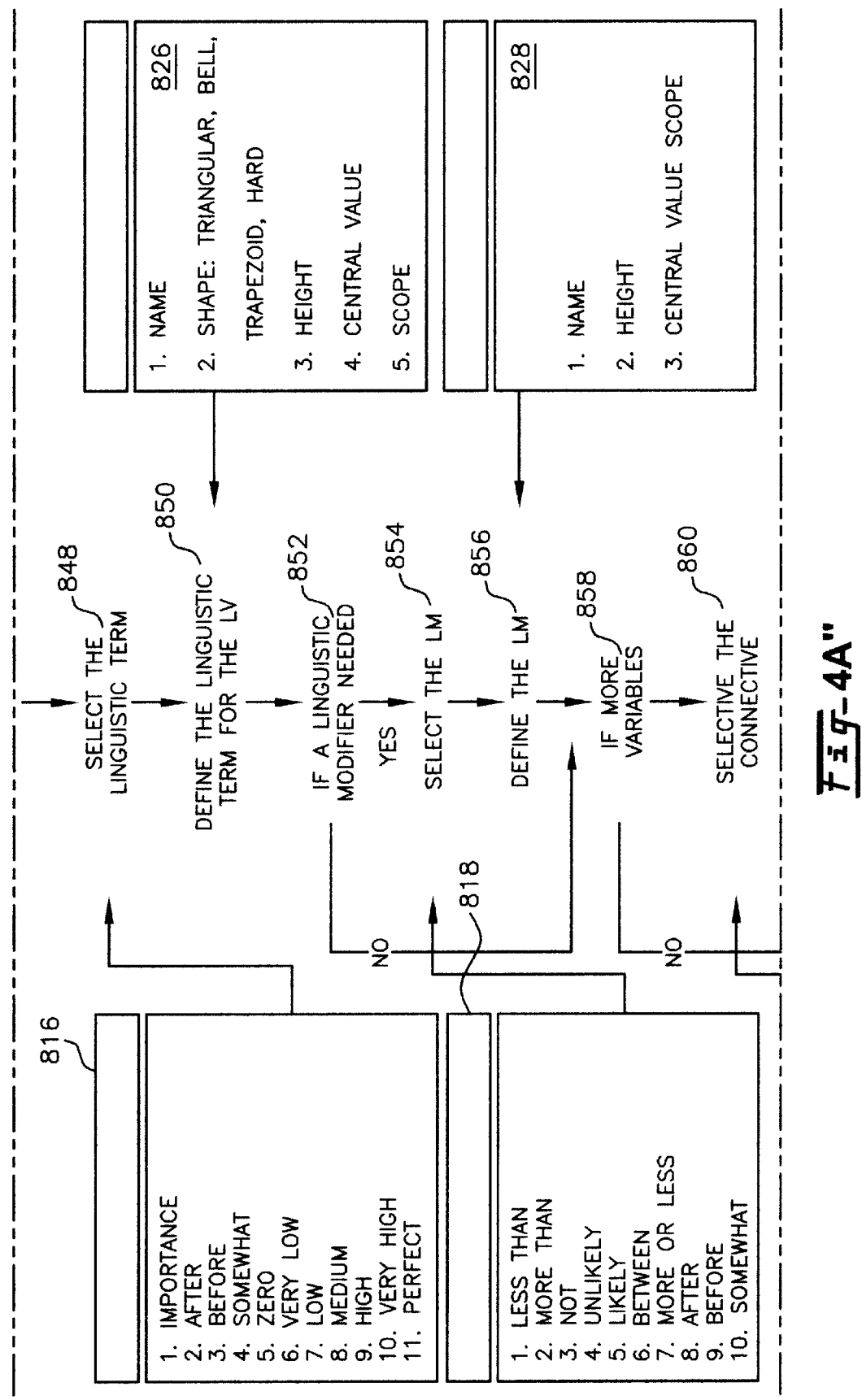
Fig-4A"

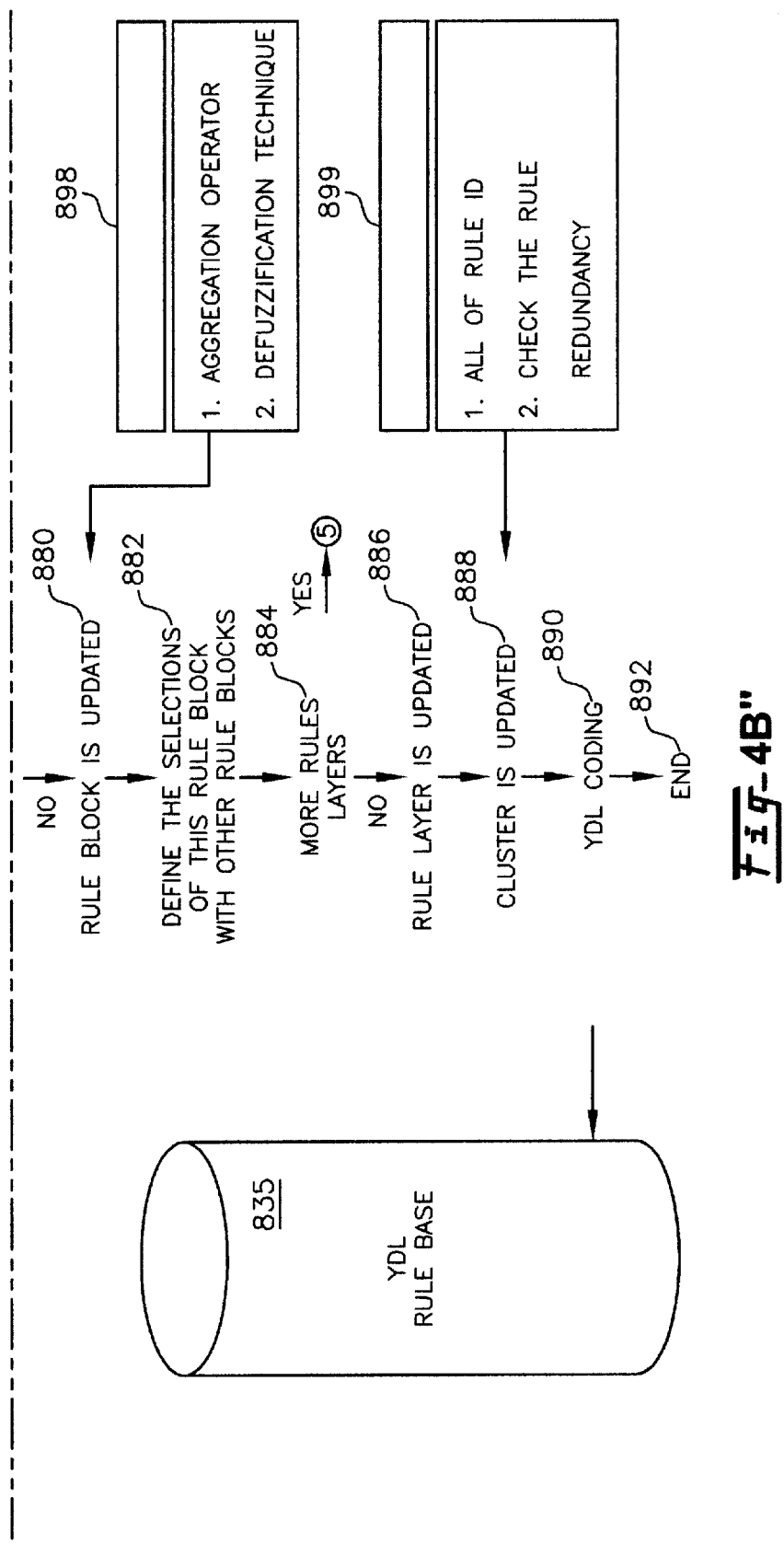

| FUNCTION TYPES | LINGUISTIC FUNCTION | LINGUISTIC TERM AND MODIFIERS | LINGUISTIC FUNCTION GRAPH |
|---|---|---|---|
| TRIANGULAR SYMMETRICAL  Fig-9A | $\mu_{\Delta s}(x,\chi,\beta) = \begin{cases} 1-2*\left(\dfrac{\|x-\chi\|}{\beta}\right) & \chi-\beta/2 \leq x \leq \chi+\beta/2 \\ 0 & \text{OTHERWISE} \end{cases}$ | ZERO, VERY LOW, MEDIUM, HIGH, VERY-HIGH, PERFECT | 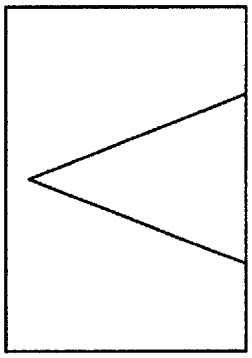 |
| TRIANGULAR ASYMMETRIC  Fig-9B | $\mu_{\Delta a}(x,\chi,\lambda_1,\lambda_2) = \begin{cases} 1+\left(\dfrac{(x-\chi)}{(x-\lambda_1)}\right) & \lambda_1 \leq x \leq \chi \\ 1+\left(\dfrac{(x-\chi)}{(x-\lambda_2)}\right) & \chi \leq x \leq \lambda_2 \\ 0 & \text{OTHERWISE} \end{cases}$ | ZERO, VERY LOW, MEDIUM, HIGH, VERY-HIGH, PERFECT | 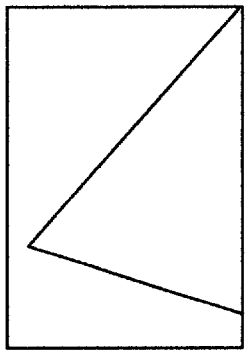 |
| S-SHAPED FUNCTION  Fig-9C | $\mu_s(x,\lambda,\chi,\beta) = \begin{cases} 0 & x \leq \lambda \\ 2*\left(\dfrac{(x-\lambda)^2}{(x-\lambda)^2}\right) & \lambda \leq x \leq \beta \\ 1-2*\left(\dfrac{(x-\chi)^2}{(x-\lambda)^2}\right) & \beta \leq x \leq \chi \\ 1 & x \geq \chi \end{cases}$ | MORE THAN, ABOVE | 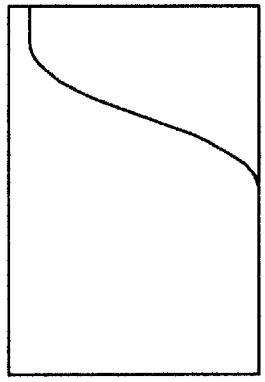 |

| | | |
|---|---|---|
| INVERTED S-SHAPED FUNCTION  *Fig-9D* | $\mu_{IS}(x,\lambda,\beta,\chi) = \begin{cases} 1 & x \leq \chi \\ 1-\mu_S(x,\chi,x+\beta/2,x+\beta) & \lambda \leq x \leq \beta \\ 0 & x \geq \lambda \end{cases}$ | LESS THAN, BELOW |
| PI-SHAPED FUNCTION  *Fig-9E* | $\mu_\pi(x,\chi,\beta) = \begin{cases} \mu_S(x,x-\beta,x-\beta/2,x) & x-\beta/2 \leq x \leq x+\beta/2 \\ 1-\mu_S(x,x,x+\beta/2,x+\beta) & \text{OTHERWISE} \end{cases}$ | LOW, MEDIUM, HIGH, MORE OR LESS |
| TRAPEZOID FUNCTION  *Fig-9F* | $\mu_{TR}(x,\chi_1,\chi_2,\lambda_1,\lambda_2) = \begin{cases} 1+((x-\chi_2)/(\chi_2-\lambda_1)) & x \leq \chi_2 \\ 1+((x-\chi_1)/(\chi_1-\lambda_2)) & x \leq \chi_1 \\ 1 & \chi_1 \leq x \leq \chi_2 \\ 0 & \text{OTHERWISE} \end{cases}$ | BETWEEN, MORE OR LESS, SOMEWHAT |

ADAPTIVE TRAVEL PURCHASING OPTIMIZATION SYSTEM

FIELD OF THE INVENTION

The present invention is generally related to travel purchasing, and more particularly to an adaptive, dynamic travel purchasing optimization system for calculating and providing a process for reducing the total cost of business travel at the point of purchase.

BACKGROUND OF THE INVENTION

Corporate travel management is a complicated task and the corporate travel industry currently uses a variety of travel software packages to implement travel purchasing. Current software packages aimed at the corporate travel industry, such as direct booking (under the trade names Sabre BTS, Internet Travel Network, etc.) and expense report processing systems, focus on increasing the efficiency of overhead costs and administrative processes. However, they have not addressed the major cost associated with the travel process—the cost of the actual travel. The cost of travel represents over 95% of total travel costs.

Unfortunately, corporations are unable to control travel costs because they do not have an effective way to analyze the options available to them at the point of purchase. In the corporate travel environment, agents and travelers have only static pre-set policies to guide them in a very dynamic marketplace. Currently, the major factor used by corporations to differentiate travel choices is price. However, corporations are unable to calculate the true price associated with each travel event due to the inaccuracy of fare cost calculation and the incomplete analyses of costs associated with an individual trip.

Inaccuracy of fare cost calculation stems from current systems that fail to calculate and display all of the dynamic options associated with each trip event. Corporations are unable to control travel costs, because they do not have an effective way to analyze the multitude of options available to them at the point of purchase. In the corporate travel environment, agents and travelers have only static pre-set policies to guide them in a very dynamic marketplace.

Currently, the major criterion used by corporations to differentiate travel choices is price or the "cheapest fare." Unfortunately, corporations are unable to calculate the true price associated with each travel event, due to static viewing of dynamic options that can equal as much as 15 percent of the total fare cost. Dynamic options include fare discounts and negotiated pricing, among others. Thus, statically viewing the travel market leads to the selection of trips which may have one desirable element, such as, cheapest fare, but are actually significantly costlier than necessary due to other dynamic factors.

For example, hypothetical corporate traveler Smith needs a flight between Cleveland and Atlanta. Smith's corporate travel agent, using an existing travel purchasing system, looks within a two hour departure window for the flight and finds the cheapest fare, according to company policy. However, there is a problem with the static policy-dedicated decision based on the cheapest fare. The existing travel purchasing system failed to reflect the overrides and back-end discounts negotiated by the company. Another flight, that is fifty dollars more according to the existing travel purchasing system, actually includes seventy-five dollars in discounts, making it the optimal flight from a dynamic cost perspective.

Incompleteness of cost calculation stems from current systems that have no way of calculating variables associated with each trip event that are even more dynamic and less tangible than price. These more dynamic and less tangible variables include costs created by differences in travel time, the productivity impact of inconvenience, the probability that lower priced choices will become available in the near future, and the impact of each choice on the ability of the airline to negotiate price discounts or bulk purchases with suppliers. In the current travel environment, no known solution addresses all of these variables, resulting in needlessly increased expenditures and reduced productivity.

Pointedly, travel policies, the most popular current cost-control method, are ineffective without an understanding of the true costs involved for each trip choice. Business travelers and their agents do not have the time, training, incentives or tools to analyze the variables. Without direct corporate intervention at the point of purchase, companies essentially rely on pure luck to ensure that agents and travelers are selecting the best trip options.

Referring back to the previous hypothetical example, corporate traveler Smith again needs a flight between Cleveland and Atlanta. Smith's corporate travel agent, using an existing travel purchasing system, looks within a two hour departure window for the flight and finds the cheapest fare, according to company policy. However, the existing travel purchasing system did not account for Smith's salary of seventy-five dollars per hour and Smith's preference for short trips due to his asthma. Another flight, that is fifty dollars more according to the existing travel purchasing system, has both a seventy-five dollar back-end discount negotiated by the company and no layover, reducing the fare by twenty-five dollars and saving Smith two hours in travel time. As a result of using a static policy-based travel purchasing system, the company lost twenty-five dollars in overall fare, lost 150 dollars in travel time for Smith's salary, and lost employee morale by putting Smith on a longer flight.

Known automated travel planners depend upon standard crisp logic decisions, basically following a series of decisions based upon crisp "Yes or No" decisions without appropriately taking into account qualitative considerations such as productivity impact of travel, negotiated contract compliance, inconvenience of traveler, airline affinity or loyalty, employee morale, frequent flyer miles, and airline policies. Such qualitative considerations may easily vary in priority from trip to trip, business to business, traveler to traveler and even day to day. Capturing varying degrees of significance of many such qualitative considerations in a conventional crisp algorithm based computer program would be a daunting programming task.

Further, such conventional systems are not easily adaptable or tunable to a particular user. Tuning or adapting such a system to changing conditions typically may be carried out by changing the algorithm. Changing an algorithm requires editing program steps and recompiling the necessary code. Essentially the program must be rewritten in order to modify preferences or change conditions. This is a time consuming and non-productive use of programming personnel.

By way of background, one example of a known system may be found in U.S. Pat. No. 5,331,546, to Webber et al., entitled "TRIP PLANNER OPTIMIZING TRAVEL ITINERARY SELECTION CONFORMING TO INDIVIDUALIZED TRAVEL POLICIES," issued Jul. 19, 1994. The entire contents of U.S. Pat. No. 5,331,546 are incorporated by reference into this patent application. Another example is U.S. Pat. No. 5,832,453 to O'Brien issued Nov. 3, 1998 and entitled "COMPUTER SYSTEM AND METHOD FOR DETERMINING A TRAVEL SCHEME MINIMIZING TRAVEL COSTS FOR AN ORGANIZATION." The entire contents of U.S. Pat. No. 5,832,453 are incorporated by reference into this patent application.

SUMMARY OF THE INVENTION

In contrast to the prior art, one embodiment of the travel purchasing optimization system (TPOS) of the invention comprises the first solution focused specifically on optimizing corporate travel decisions at the point of purchase using the elegance and power of fuzzy membership functions. The invention is based on the concept that corporations already possess enough information to efficiently calculate the true cost of travel. The invented travel purchasing optimization system collects available information, brings it to the point of purchase, and analyzes it for the various choices available in the marketplace using a process referred to as dynamic optimization. Dynamic optimization synthesizes qualitative and quantitative components associated with the total cost of travel. The quantitative components include, but are not limited to, commission refunds, negotiated discounts, overrides, and cost of travel time. The qualitative components include, but are not limited to, productivity impact of travel, negotiated contract compliance, inconvenience of traveler, airline affinity or loyalty, employee morale, frequent flyer miles, and airline policies. Qualitative components are advantageously represented using fuzzy membership functions.

To dynamically optimize decision making at the point of purchase, the invented travel purchasing optimization system uses leading edge fuzzy logic based computational intelligence techniques to calculate the total cost of travel by weighing monetary and non-monetary variables. The invented travel purchasing optimization system collects pertinent information from existing enterprise software systems and data repositories to analyze the available choices. It calculates the total cost of travel (TCOT) for each of the choices available to a traveler, allowing the corporation to enforce lowest total cost purchases.

From an economic standpoint the total cost of travel (TCOT) includes any variable that impacts the desirability of a particular choice. Fuzzy logic based computational intelligence makes it easier to model the human thought process and to deal with systems where a clear mathematical model is not known, such as, calculation of the TCOT. For example, any traveler can tell you that "all 500 dollar tickets are not the same," since there are different "costs," beyond price, that reflect the value of the ticket; however, existing travel purchasing systems could not differentiate the value of the two 500 dollar tickets. Therefore, the invented travel purchasing optimization system holistically analyzes travel choices by examining variables that reduce the direct costs of travel, while ensuring that indirect costs, such as convenience and service, are not excessively compromised.

It is an object of the present invention to provide an accurate and complete travel purchasing optimization system for calculating the total cost of travel with a reduced rule set at the point of purchase.

It is another object of the present invention to increase accuracy in the calculation of the total cost of travel by processing qualitative and quantitative factors.

It is an object of the present invention to provide a modeling language to represent qualitative and quantitative factors in terms of linguistic variables used for calculating the total cost of travel using fuzzy logic based computational intelligence.

In accordance with the present invention, a travel purchasing optimization system comprises a cognizer in communication with a knowledge base and a rule base. A knowledge acquisition and rule manager (KARM) dynamically creates, alters, and fine tunes rules for the rule base from existing business knowledge using Yatra description language. A travel request is made through an external booking system and sent to the cognizer via an integration framework and the knowledge base. The integration framework pools data from a series of external systems or databases. The cognizer compares the rules from the rule base with the pooled data from the integration framework. The cognizer generates the total cost of travel (TCOT) and sends the TCOT back to the external booking system via the integration framework at the point of purchase. Other objects, features and advantages of the present invention will become apparent to those skilled in the art through the description of the preferred embodiment, claims and drawings wherein like numerals refer to like elements.

BRIEF DESCRIPTION OF THE DRAWINGS

FIGS. 9A–9F illustrate examples of Meta knowledge functional relationships employed in various embodiments of the invention.

DETAILED DESCRIPTION OF THE INVENTION

Figure 1A:
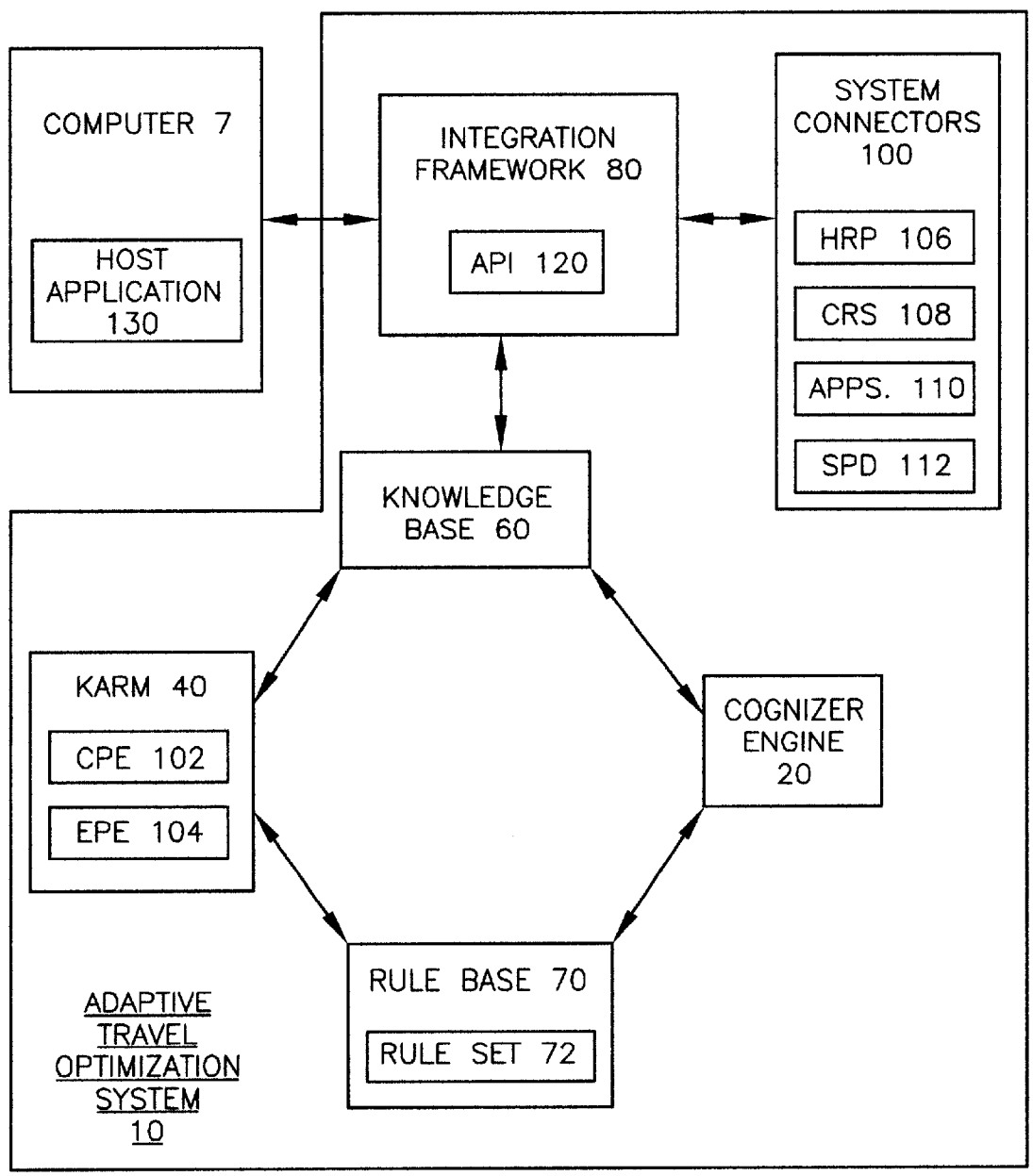
FIG. 1A is a schematic block diagram generally illustrating an example of a Travel Purchasing Optimization System (TPOS) of the present invention.

Now referring to FIG. 1, FIG. 1 represents a travel purchasing optimization system (TPOS) 10 of the current invention. Travel purchasing optimization system 10 assesses the total cost of travel (TCOT) associated with a specific travel event by creating fuzzy logic rules centered on a corporation's model of cost optimization, wherein the rules change to fit changes in the corporation's model and changes in the travel environment. Travel purchasing optimization system 10 uses relevant data and corporate rules to dynamically calculate the TCOT at the point of purchase. Those skilled in the art, having the benefit of this disclosure, will understand that the elements of travel purchasing optimization system 10 may advantageously be embodied in software modules written in any standard software language.

The software may reside on personal computers, personal computer servers, UNIX servers or workstations, other enterprise class computers and other equivalent computer platforms. The modules may advantageously communicate through standard communication protocols, including standard Internet based protocols.

Travel purchasing optmization system 10 consists of a cognizer 20 in communication with a knowledge base 60 and a rule base 70. A knowledge acquisition and rule manager (KARM) 40 is also in communication with the knowledge base 60 and the rule base 70. Knowledge acquisition and rule manager 40 creates a plurality of rules 72 based on a corporation's model of travel cost optimization through user input in the form of preferences and goals or, succinctly, business knowledge. KARM 40 may also use data stored in a data mart 140 (shown in FIG. 1B) to help create rules 72, wherein data mart 140 is a data archive that continuously stores and updates data from previous travel events. Moreover, knowledge acquisition and rule manager 40 creates rules 72 in a dedicated modeling language called Yatra description language (YDL). YDL uses the syntax described below in Table 1.

One skilled in the art or one familiar with any fourth generation language, such as Structured Query Language (SQL) or BASIC will be able to use the YDL syntax below to construct any business rules required for the system. YDL is a rule modeling language created by YATRA Corp. of Minneapolis, Minn. An alternative to creating rules using a modeling language such as YDL, is the use of a graphical user interface (GUI) for activating and using knowledge acquisition and rule manager 40. Such a graphical user interface may advantageously include iconical representations of rules, rule adjustment controls and data. As will be appreciated by those skilled in the art, having the benefit of this disclosure, graphical controls may include sliders, knobs, dials, buttons and other commonly used GUI features and controls. Such a graphical user interface may be conveniently used to implement YDL rules. Examples of typical rules expressed in YDL are appended in Appendix A hereto.

Knowledge acquisition and rule manager 40 then stores the rules 72 in rule base 70. Hence, rule base 70 contains rules 72 based on business knowledge and relevant data specific to individual travelers, as well as, rules 72 applicable to a group, department, or corporation. Rule base 70 stores rules 72 until a user uses knowledge acquisition and rule manager 40 to update rules 72 based on changes in business knowledge and/or relevant data.

For each business travel event, a user makes a travel event request through a host application 130, such as, a direct booking system (DBS) via the intranet/internet, a commercial booking system (Turbo Sabre, Apollo, etc.), or a consumer booking system (Sabre BTS, ITN, etc.). Integration framework 80 may comprise standard software programs well known to those skilled in the art. Integration framework 80 includes an Object Server 806 that serves to interface with industry standard technology such as SQL,/ODBC (open database connectivity), ActiveX, CORBA (common object request broker architecture), JAVA and Messaging Oriented Middleware (MOM). Host application 130 connects to travel purchasing optimization system 10 via a standard application programming interface (API) 120. The API 120 may reside, for example, in the HOST application or in integration framework 80. The integration framework 80 serves as a universal connector between host application 130 and travel purchasing optimization system 10; thereby, ensuring that travel purchasing optimization system will work in any existing environment. The host application 130 also has access to knowledge base 60 and cognizer 20 functions through, for example, a standard application programming interface 120.

In addition to serving as a gateway for host application 130, integration framework 80 acts as a session manager and data manager during a travel request. Integration framework 80 integrates information from a plurality of system connectors 100 into a format that is compatible with knowledge base 60 and cognizer 20. Knowledge acquisition and rule manager 40 also comprises a corporate preference editor (CPE) 102 and, an employee preference editor (EPE) 104. System connectors 100 include human resources profiles (HRP) 106, computer reservation systems (CRSS) 108, any outside custom applications 110, and special pricing databases (SPD) 112. All of the system connectors 100 contain information relevant to the travel purchase request. In one example, CPE 102 and EPE 104 provide travel preferences of a corporation and an individual employee, respectively. HRP 106 provides financial information about the corporation, and also, provides detailed employee profiles. CRSs 108 are now commonly known as global distribution systems (Sabre, Worldspan, Apollo, etc.) that provide trip information, traveler information, and available flights, including pricing information. Custom applications 110 comprise applications used by a corporation that contain relevant corporate and employee information. Custom applications are outside of the invention, although they may be accommodated by the software modules included in the invention. Special pricing database 112 contains pricing information not available through CRSs 108, including custom/negotiated contracts with the airlines and discounts taken through travel agency commissions and overrides.

Through integration framework 80 and system connectors 100, knowledge base 60 is continuously updated with the most recent data about travelers, corporate preferences, and supplier information; therefore, knowledge base 60 is a transient data store for travel purchasing optimization system. At the time of the travel request knowledge base 60 captures all of the information available in the system connectors 100 from integration framework 80 and transforms it into a format optimized for cognizer 20.

Figure 1B:
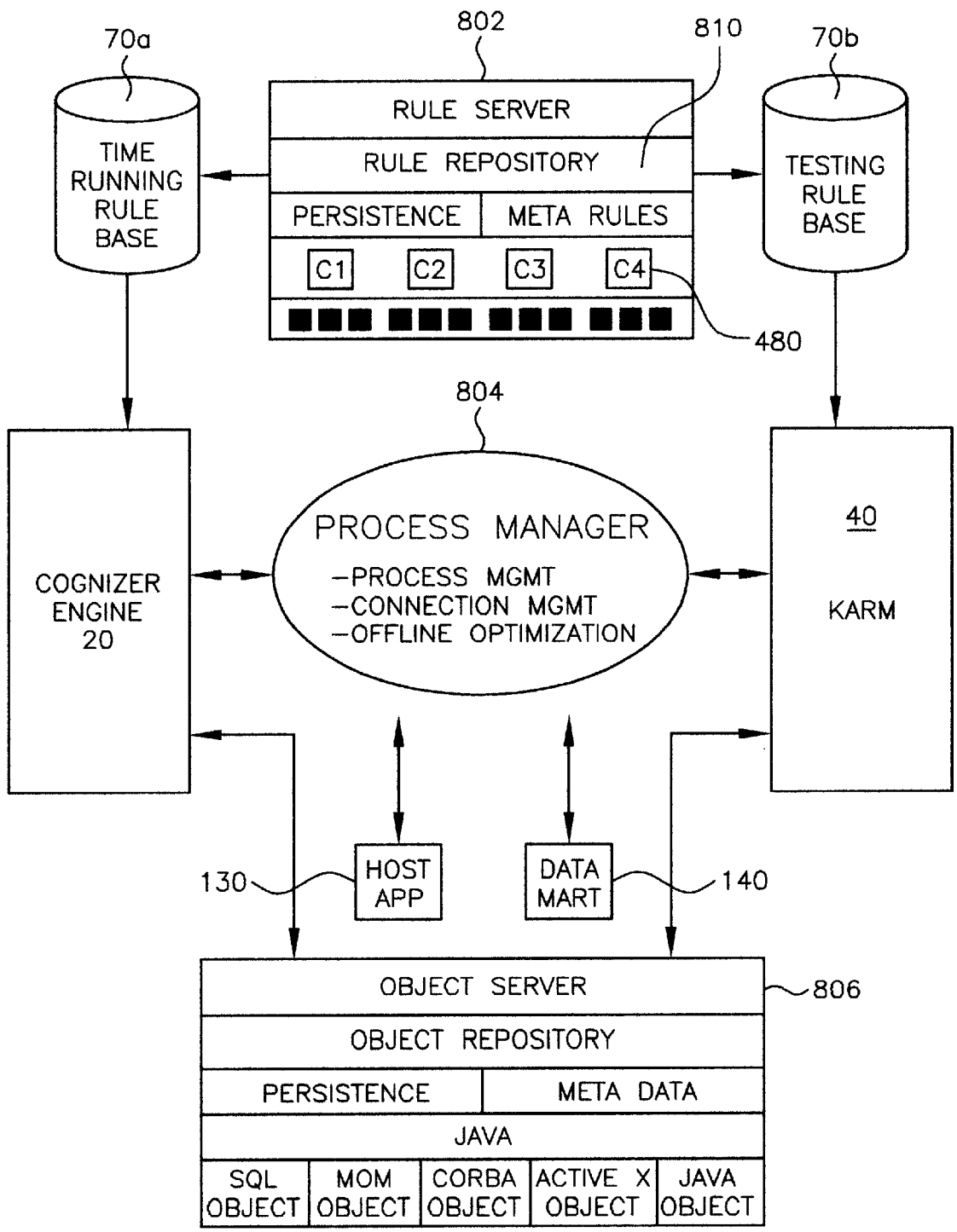
FIG. 1B is a schematic block diagram illustrating an example of integration framework in more detail.

Referring now to FIG. 1B, a block diagram illustrating the integration framework 80 in more detail is shown. Integration framework 80 includes a rule server 802, an object server 806, and a process manager 804. The rule server 802 further includes a rule depository 810 with persistent rules and Meta rules organized in a plurality of clusters C1–C4, for example. Referring again to Appendix A, examples of clusters including a fare pricing cluster, contracts cluster and human resource cluster are shown. The process manager 804 administers multiple copies of the operating cognizer engine to process multiple TPOS queries. This is analogous to a multi-tasking operating system operating in a standard manner. Similarly, it performs connection management and offline optimization of rules. Certain rules can be precalculated since they are not dependent on time varying factors. These calculations may advantageously be handled off line to save processing time.

Cognizer 20 is the core engine of travel purchasing optimization system. It takes monetary and non-monetary data captured by knowledge base 60 for a particular travel request and analyzes the data. Cognizer 20, uses fuzzy logic in a process called "cognification," explained in detail below. The cognizer 20 associates the rules with current data and applies fuzzy reasoning to calculate the various quantities and weights required to generate a total cost of travel (TCOT). Cognizer 20 then returns the TCOT calculation, via integration framework 80, to host application 130, where the end user receives the information. The end user may then make another travel request based on another travel event.

Figure 2:
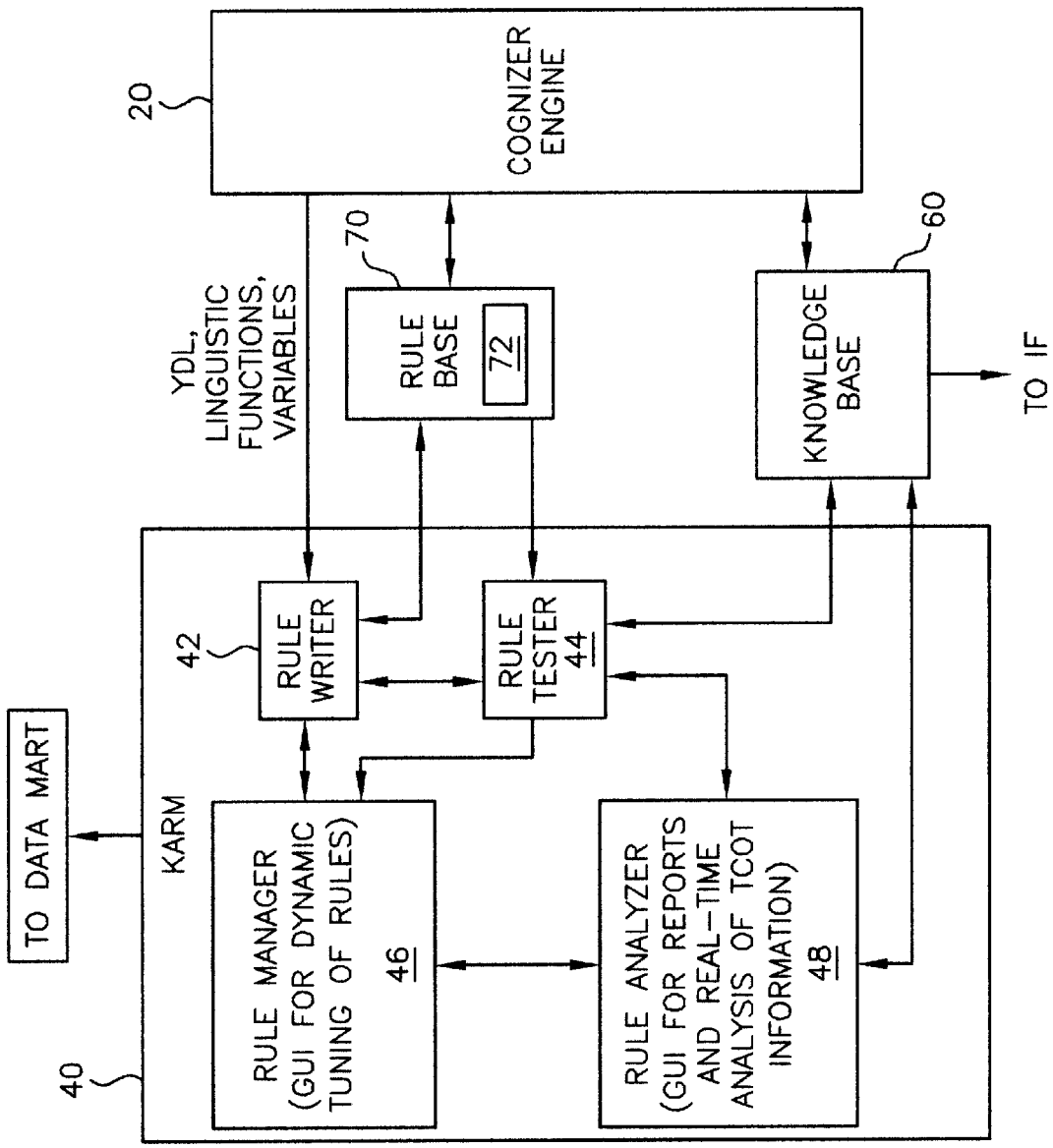
FIG. 2 is a diagram generally illustrating an example of a knowledge acquisition and rule manager (KARM) of the present invention.

Now referring to FIG. 2, a block diagram of one embodiment of knowledge acquisition and rule manager 40 in communication with rule base 70, knowledge base 60, and cognizer 20 is shown. Knowledge acquisition and rule manager 40 performs the functions of building rule base 70 by creating a plurality of rules 72 in the Yatra definition language (YDL), fine tuning rules 72, altering the weighting and interaction between rules 72, and reporting impacts of different rules 72 on the TCOT. Cognizer 20 then uses rule base 70 in conjunction with the information in knowledge base 60 to calculate the TCOT. Adaptive fuzzy rules may be advantageously fine-tuned by changing membership functions, operators and operator parameters. Reporting is carried out by outputting statistics related to the different rules for the purpose of off line analysis. Such information may be stored in a history file.

Rules 72 are expressed in a modeling language, preferably YDL, to describe the business knowledge upon which they are based. YDL is based on attributed grammar and consists of terminal vocabulary ($V_T$), non-terminal vocabulary ($V_N$), production rules (P), a starting symbol (S), and Meta knowledge ({M}), wherein Meta knowledge represents common sense understanding of travel business knowledge. Meta knowledge, in turn, has terminal vocabulary ($M_T$), non-terminal vocabulary ($M_V$), production rules ($M_P$) and a starting symbol ($M_S$). A set of attributes for each of the production rules demonstrates the constraints and memberships of the rule production stages.

YDL Rule Structure

Figure 3B:
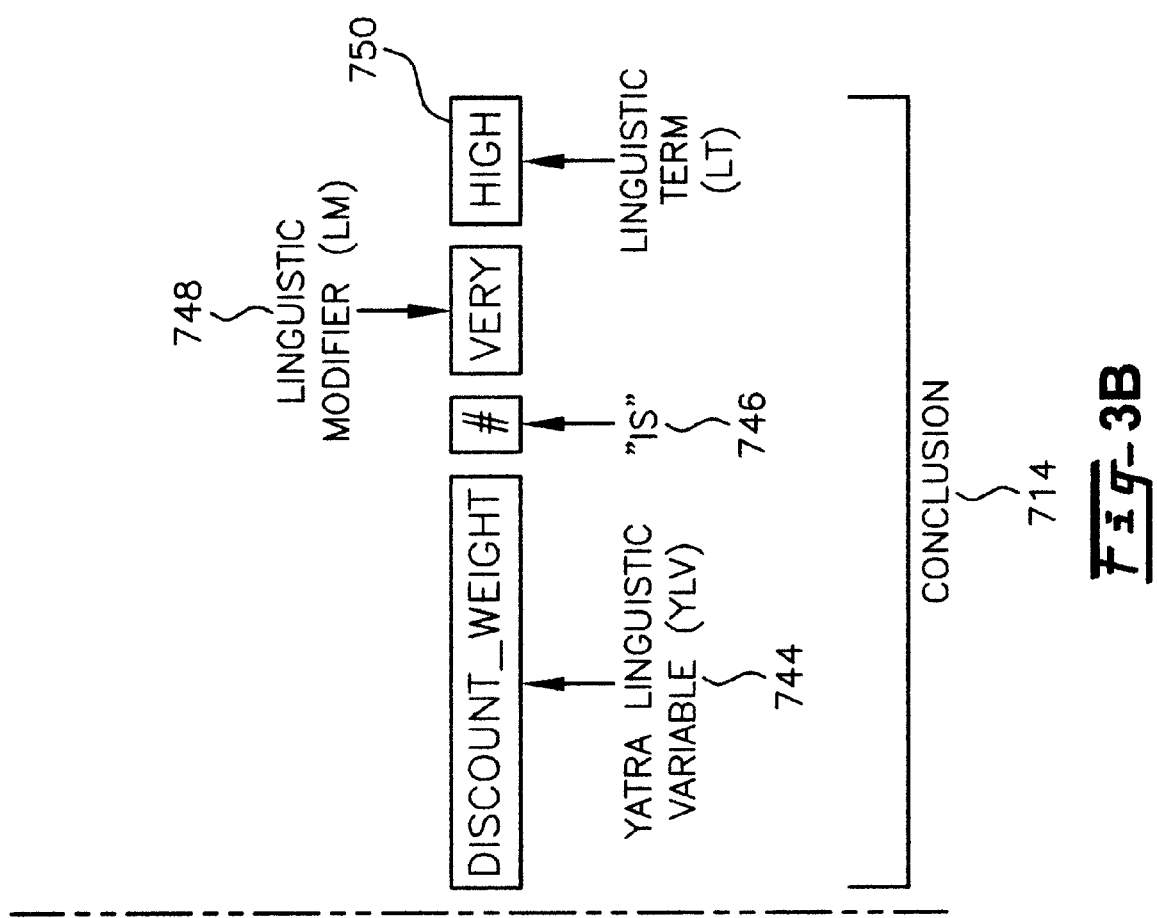
FIG. 3 shows a conceptual diagram of an example of YDL rule.

Referring now to FIG. 3, a conceptual diagram of an example of YDL rule structure is shown. The rule structure is a computer-implemented digital word that includes a plurality of blocks including a rule label 710, a premise 712 and a conclusion 714. Each block comprises a plurality of sub-blocks. The rule label 710 includes a letter designation sub-block 701, a cluster number sub-block 702, and a rule block number sub-block 704. A separator character 708 separates the rule label 710 from the premise 712. The premise 712 includes a linguistic variable sub-block 716, a first relational character sub-block 718, a first linguistic modifier sub-block 720, a first linguistic term sub-block 722, a fuzzy connective operator sub-block 724, a first linguistic variable sub-block 726, a second relational character sub-block 728, a second linguistic modifier sub-block 730, a second linguistic term subblock 740 and a second relational character sub-block 742. Conclusion 714 includes a second linguistic variable 744, a third relational character sub-block 746, a third linguistic modifier 748 and a third linguistic term 750.

In a preferred embodiment of the invention, the YDL rule structure shown is coded into a machine readable code in accordance with principles understood by those skilled in the art. The example shown in FIG. 3 illustrates one possible rule and it will be understood that numerous rules may be encoded as required by the rule generation specified for particular applications. Syntax for the various rule blocks and sub-blocks is described in detail herein with reference to Table 1.

Table 1 shows the syntax of YDL. Those skilled in the art, having the benefit of this disclosure, will understand that the syntax detailed hereinbelow is by way of example and that the invention is not so limited.

TABLE 1

Syntax of YDL Language

Attributed Grammar of YDL Language, G(YDL) = {$V_T$, $V_N$, P, L, S, {M}, {A}}, consists of Terminal Vocabulary $V_T$, Non-terminal Vocabulary $V_N$, Production rules P, starting symbol S, Meta knowledge {M}, which in turn has terminal, Non-terminal vocabularies, starting symbol and production rules, this follows with the set of attributes {A}, for each of the production rules, which demonstrate the constraints and memberships of the rule production stages.
Terminal Vocabulary $V_T \rightarrow$ {":", "#", "&", "%", " ^", " ^", "!", "+",
 "Zero", "Low", "Medium", "High", "Perfect", "Very", "LessThan", "MoreThan",
 "Between", "Above", "Below", "Around", "After", "Before", "MoreOrLess", "Likely",
 "Unlikely", "Possibly", "Important", "Somewhat", "Budget Preferences", "HR-
 Preferences", "Corporate Preferences", "Reporting", "Employee", "Fare", "Discount",
 "Convenience", "NegotiatedContract", "TravelClass", "Budget", "FreeUpgrade",
 "Trip", "Ticket", "TimeWindow"}
Non-terminal Vocabulary $V_N \rightarrow$ {Variable, Operator, Cluster, Premise, Conclusion,
Modifier, Term, Rule, RuleBlock, Rulebase, Cluster}
The Production Rules are:
S→<Rulebase>
<Rulebase>→{<RuleCluster><Rulebase>} | λ
<RuleCluster>→{<RuleBlock><RuleCluster>} | λ
<RuleBlock>→{<Rule><RuleBlock>} | λ
<Rule>→<Label>: <Premise>= <Conclusion>    =>{μ = Importance or weight}
<Label>→"R"<RuleClusterNumber><RuleBlockNumber><RuleNumber>
<Premise>→{<Operator><Premise>} | λ
<Premise>→<Variable> # [<Modifier>]<Term>
<Conclusion>→{<Operator><Conclusion>} | λ
<Conclusion>→<Variable> # [<Modifier>]<Term>
<Operator>→{"&", "%", "!", "+"}
<Term>→{"Zero", "Low", "Medium", "High", "Perfect"}
<Modifier>→{"Above", "Below", "Around", "After", "Before", "MoreOrLess", "Likely",
"Unlikely", "Possibly", "Important", "Somewhat"}
<RuleCluster>→{"Budget Preferences", "Corporate Preferences", "HR-Preferences",

TABLE 1-continued

Syntax of YDL Language

"Contract-Analysis", "Department-Policy", "Employee-Preferences"}
<Variable>→{"Fare", "Discount", "Convenience", "NegotiatedContract",
"TravelClass", "Employee", "Budget", "FreeUpgrade", "Trip", "Ticket", "TimeWindow"}
Meta Knowledge M {$M_T$, $M_N$, $M_P$, $M_S$}
$M_T$→{"Set", "Default", "Format", "Type", "Height", "Width", "Center-1", "Center-2",
"AlphaCut", ",",
  "=",}
$M_N$→{Value, FuzzyValue, Formatting, Thresholding, Definition, TermFormat,
OpFormat, ModifierFormat }
$M_S$→<Formatting> | <Thresholding> | <Definition>
<Formatting>→<TermFormat> | <OpFormat> | <ModifierFormat>
<TermFormat>→"Format" <Term> "Type" "=" <MembershipFunctionType>"," "Height"
"="
    <Value> "," "MinScope" "=" <Value> "," "MaxScope" "=" <Value> "," "Center-1"
    "=" <Value> ["," "Center-2" "=" <Value>]
<OpFormat>→"Format" <Operator> "Type" "=" <OpType>
<ModifierFormat>→<Modifier> "=" <ModiType>
<Thresholding>→<Variable> "AlphaCut" "=" <FuzzyValue>
<Definition>→"Set" "=" "Default"
<MembershipFunctionType>→{"Triangular", "TriangularSymmetric", "S-Shaped",
"Trapezoid", "Pi
    -Shaped"}
<OperatorType>→{"Yager", "Zadeh", "Mamdani", "OWA"}
<ModiType>→{"Sharp", "Soft", "Medium", "Zadeh"}
<Value>→{n | n ∈ R}
<FuzzyValue> {n | n ∈ [0,1] | n ≥ 0}

*End Table 1*

Referring again to FIG. 2, knowledge acquisition and rule manager 40 will allow end users to create rules 72 and build rule base 70 in either of two ways. First, a rule manager 46 will allow customers and non-technical developers to create rules 72 without knowing YDL. Second, a rule writer 42 will allow advanced users, or programmers, to create rules 72 rapidly using YDL.

Rule manager 46 will allow customers and non-technical developers to create, examine, and fine tune rules 72 within rule base 70 using a simplified graphical user interface (GUI). Although all rules 72 must be eventually written in YDL, users will not need to know YDL to run rule manager 46. Rule manager 46 will provide the user with a simplified interface containing information on the linguistic variables and parameters (see Table 1) used in YDL to generate and alter rules 72. Users alter the linguistic variables and parameters using a dial, or meter-based, system—moving the dial will change the linguistic variable or parameter. Users enter or change rules 72 by using the linguistic variables and parameters in a standard rule format (e.g., If . . . Then . . . Else). Moreover, it is contemplated that rule manager 46 may advantageously allow users to enter less complex rules 72 in syntax similar to natural language that will be translated by rule manager 46 into rules 72. Rule manager 46 also shows graphically the weighting and relationships between rules 72 in rule base 70.

Rule writer 42 is in communication with rule manager 46 and allows advanced users, or programmers, to rapidly create, examine, and fine tune rules 72 using pure YDL through the rule manager 46 interface. Rule writer 42 allows entry and alteration of linguistic variables, creation of rules 72 using linguistic variables, operators, and functions (see Table 1), and creation and definition of weighting to govern the interaction between rules 72. Moreover, as the number of rules 72 increase, rule writer 42 will allow governing of the relative importance of different rules 72 within rule base 70.

Both rule writer 42 and rule manager 46 are in communication with a rule tester 44 that is in communication with rule base 70 and knowledge base 60. Rule tester 44 verifies that rules 72 have been entered in the correct syntax and do not corrupt rule base 70. Moreover, a rule 72 can be debugged by rule writer 42 by testing it within rule tester 44. Regardless of whether a rule 72 is created by rule manager 46 or rule writer 42, the rule 72 must pass through rule tester 44 before being placed in rule base 70.

Both rule writer 42 and rule manager 46 (via rule manager 46 ) are in communication with a rule analyzer 48 that is in communication with rule base 70 (via rule tester 44 ) and knowledge base 60. Rule analyzer 48 indicates the impact of rule and variable changes on the TCOT calculation. When specific changes are made to rule base 70, rule analyzer 48 interacts with rule manager 46 and rule tester 44 to pinpoint the is specific impact. Based on the rule analyzer 48 information, a user can use rule manager 46 or rule writer 42 to optimize rules 72 within rule base 70. Moreover, rule analyzer 48 produces reports synthesizing TCOT data to show the relevance and significance of individual rules 72. The number of reports will increase as user feedback is collected over time.

Algorithm 1—YDL Rule Generation in the KARM

Figure 4A:
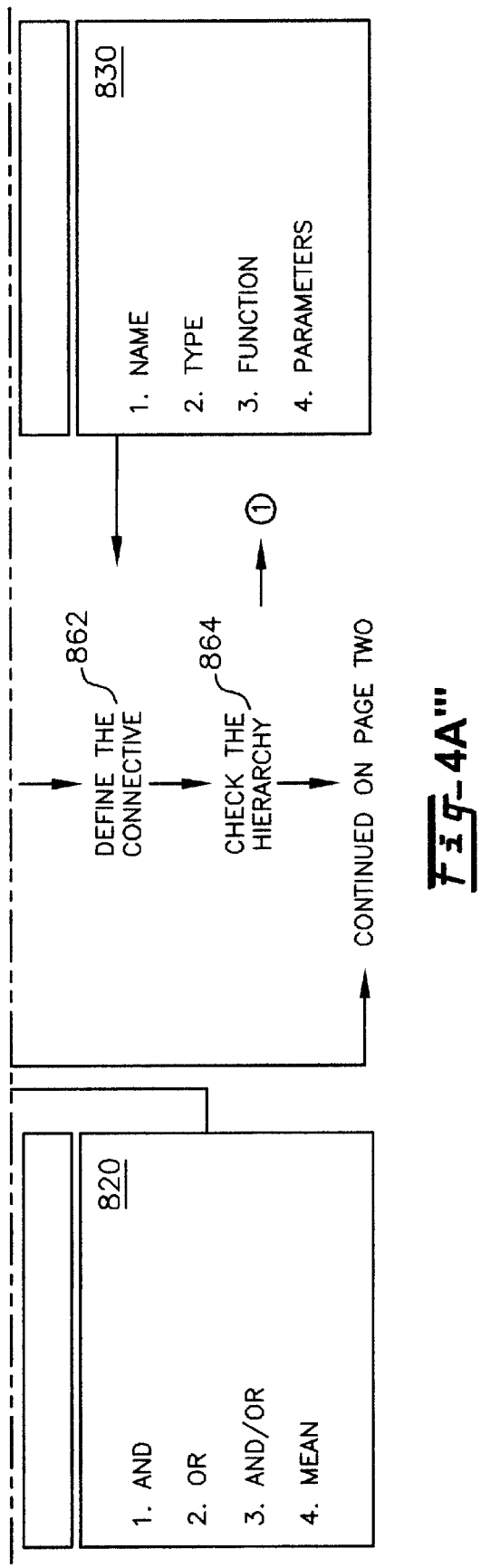
FIGS. 4A and 4B are intended to be read together to show a block flow diagram of a method for generating rule modeling descriptive language words.
Figure 4B:
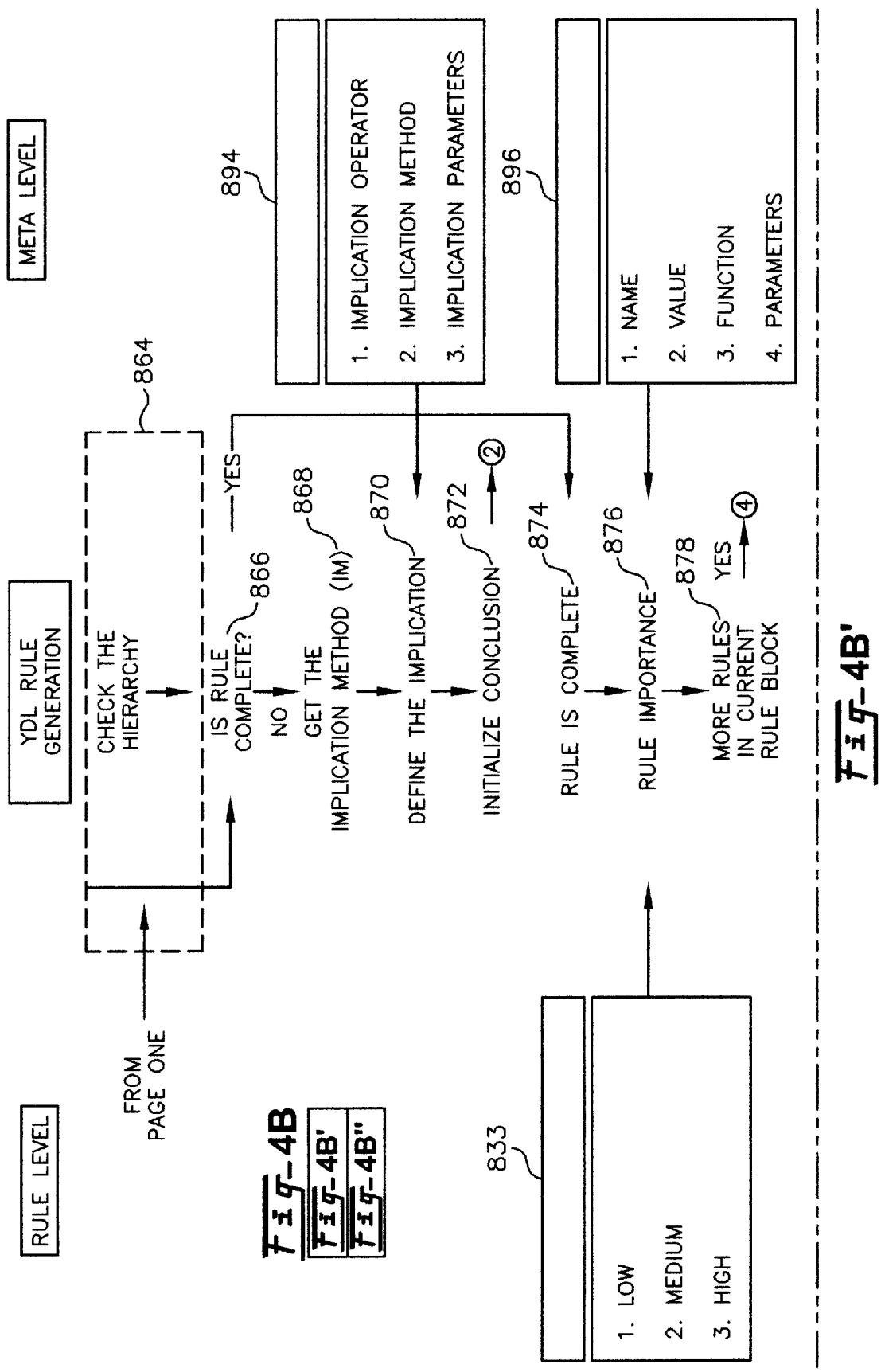

Now referring to FIGS. 4A and 4B, these figures are intended to be read together to show a block flow diagram of a method for generating rule modeling descriptive language words as carried out in the KARM. The rule generation language is shown for illustrative purposes to have inputs from a rule level and a Meta level. Both the rule level and the Meta level represent information storage areas in a storage device. The designation "rule level" and "Meta level" are for convenience of differentiating two types of information.

Meta Level information is deeper information, which goes into a rule. One example of a fuzzy rule in pseudo code may be:

"If Salary is High then Person is Important."

Selection of the terms (i.e. "salary," "high," "person," and "important") at this level is rule information at the rule level. But what these terms actually represent is the Meta knowledge. It will be understood that numerous such rules can be incorporated into the method of the invention for determining a total cost of travel.

For example the term "high" can be a triangular shaped function, which begins at some value (e.g. $50,000 US) and ends at some value (e.g. $120,000 US), that comprises the scope of High and its central value is $85,000 US. Examples of such functions are described in further detail hereinbelow.

As shown in FIGS. 4A–4B one example of a method for generating rules for a travel cost optimization system for determining a total cost of travel generally includes the major steps of:

a) identifying a rule location within a hierarchy of a rule base that includes a rule cluster, wherein the rule cluster includes a rule block;

b) selecting premise and conclusion linguistic variables and a predetermined meta knowledge function; and c) defining a relationship between at least one linguistic variable and said premise and conclusion using at least one linguistic term, a fuzzy operator and an implication operator to generate a rule.

The method may further comprise the steps of defining a relative level of the generated rule to other rules within a cluster including at least one rule block, selecting the meta knowledge function from the group consisting of a triangular symmetrical function, a triangular asymmetric function, an S-shaped function, an inverted S-shaped function, a Pi-shaped function, and a trapezoidal function, creating a plurality of rule block instances from a plurality of generated rules, where said rule block instances comprise a plurality of similar rules from different corporate perspectives as determined from input data, and the step of creating a plurality of cluster instances comprising a plurality of rule block instances.

The above general steps are broken down into detailed process steps beginning at method step 832 where a plurality of clusters 812 is stored in a memory device. The clusters preferably include groups of preferences that may be expressed to a computer user in English, for example, or as a number of G. U. I. icons. The user selects desired cluster from the plurality of clusters to add to the rules being generated for the user's specific application. Example clusters of preferences may include corporate preferences, human resource preferences, contract analysis preferences, employee preferences, department policy preferences and budget preferences. It will be understood that the clusters of preferences may include more or less of the listed preferences in addition to other preferences as identified by the user. Examples of clusters and the corresponding relationship between clusters, business rules and YDL rules are shown in Appendix A hereto. Appendix A and Appendix B are submitted with this specification and incorporated in full into this application by this reference.

At method step 834, cluster information corresponding to the selected preference is input into the process. Cluster structure 822 may preferably include cluster instances, rule layers, rule blocks and rules. At method step 836, a selected rule layer is added to the process. At method step 838, a new rule block is added to the process. At step 840, the new rule is initialize. At step 842, the premise of the rule is initialize. At step 844, a linguistic variable is selected from a plurality of stored linguistic variables 814. The stored linguistic variables may include for example, employee, trip, budget, fare, time window, free upgrade, negotiated contract, convenience, class, discount, ticket and any other variables relating to travel. Next at step 846, Meta knowledge for the linguistic variable is defined. Meta knowledge for the linguistic variable is stored in an object repository 824 and may include human resources information, financial data, contract information, travel policy, and preference data. The data in the object depository may be expressed in document files, data files or as icons representing the required information. The user may access the data using standard input/output devices such as a standard pointing device or a computer keyboard.

Next, at step 848 a linguistic term is selected from a plurality of stored linguistic terms 816. Stored linguistic terms 816 may include importance, after, before, somewhat, zero, very low, low, medium, high, very high, perfect and other linguistic terms as needed for any specific application. At step 850 the linguistic term for the linguistic variable is defined from a list of stored linguistic term definitions 826. The linguistic term definitions 826 may include, for example, name, shape, height, Central value, scope and any other desired term definitions as selected for a particular application. Next, at step 852 a decision is made as to whether to use a linguistic modifier.

If a linguistic modifier is needed the method proceeds to step 854 where a linguistic modifier is selected from a list of linguistic modifier definitions 818. Linguistic modifier definitions may include the terms "less than", "more than," "not," "unlikely," "likely," "between," "more or less," "after," "before," and "somewhat." Next, at step 856 the linguistic modifier is defined using information from the Meta level that is stored in the linguistic modifier database 828. A plurality of linguistic modifiers 828 are stored and may include name, height, central value scope and any other desired term that serves as a useful modifier for a particular application.

If a linguistic modifier is not needed, the method skips step 852 to step 858. At step 858, a decision is made to determine whether more variables are needed. If more variables are needed, a connective is selected from a plurality of fuzzy operators 820. Fuzzy operators may include, but are not limited to, "and," "or," "and/or," and "mean," and other connectives. At step 862, the selected connective is defined using stored operator definitions 830 including name, type, function and parameters.

Now referring to FIG. 4B, the hierarchy of connectives is checked. If the highest level has not been attained, the process returns to step 842 and resumes from that point. If the highest level has been attained, the process continues to step 866. At step 866 a decision is made as to whether the current rule being generated is complete. If it is not complete, the process goes to step 868 where an implication method is obtained. Next at step 870 the implication is defined using stored implication definitions 894. The stored implication definitions may include an implication operator, an implication method and implication parameters. At step 872, a conclusion is initialized and the method returns to process step 844 and resumes processing from that point.

If the rule is complete at step 866, the process moves from step 866 to step 874 showing a complete rule. Next, at step 876 rule importance is assigned from a database of rule weights 833. Rule weights 833 include low, medium and high weighting factors. At step 878, a query is made to determine if more rules are in the current rule block. If more rules remain then the process returns to step 838 to add the new rule. If no more rules remain, the process goes to step 886 where the rule layer is updated. Next at step 888 the cluster is updated using information from rule creation database 899. Rule creation database 899 includes all of rule ID and a check for rule redundancy. At step 890 the rule is coded and stored in rule database 835. The process ends at step 892.

Referring now again to FIG. 2, once knowledge acquisition and rule manager 40 has finished a rule generation algorithm (an example of which is shown in FIGS. 4A–4B), the generated rules 72 are stored in rule base 70. Rule base 70 represents the business knowledge used by the fuzzy logic algorithms of cognizer 20. Using the linguistic functions available in the cognizer 20, rule base 70 adapts dynamically in conjunction with user organizations. The resulting rule base 70 provides the analytical logic for computing the TCOT of different travel options in real-time. As a result, rule base 70 does not require exact preset rules to assess the impact of qualitative factors. For example, rule base 70 does not require crisp data specifying exactly how much deviation is permitted from a supplier volume target before the weighting for that supplier's products should change. Instead, cognizer 20 includes fuzzy information specifying that a 3% deviation is high, and a 2.8% deviation is slightly less high, and the impact on weighting should be slightly less for the lower deviation. Thus, unlike existing travel purchasing systems, the instant invention's travel purchasing optimization system does not require a large number of highly specific preset rules to asses the impact of qualitative factors. Instead, rule base 70 captures core information in less than one hundred rules 72.

Figure 5:
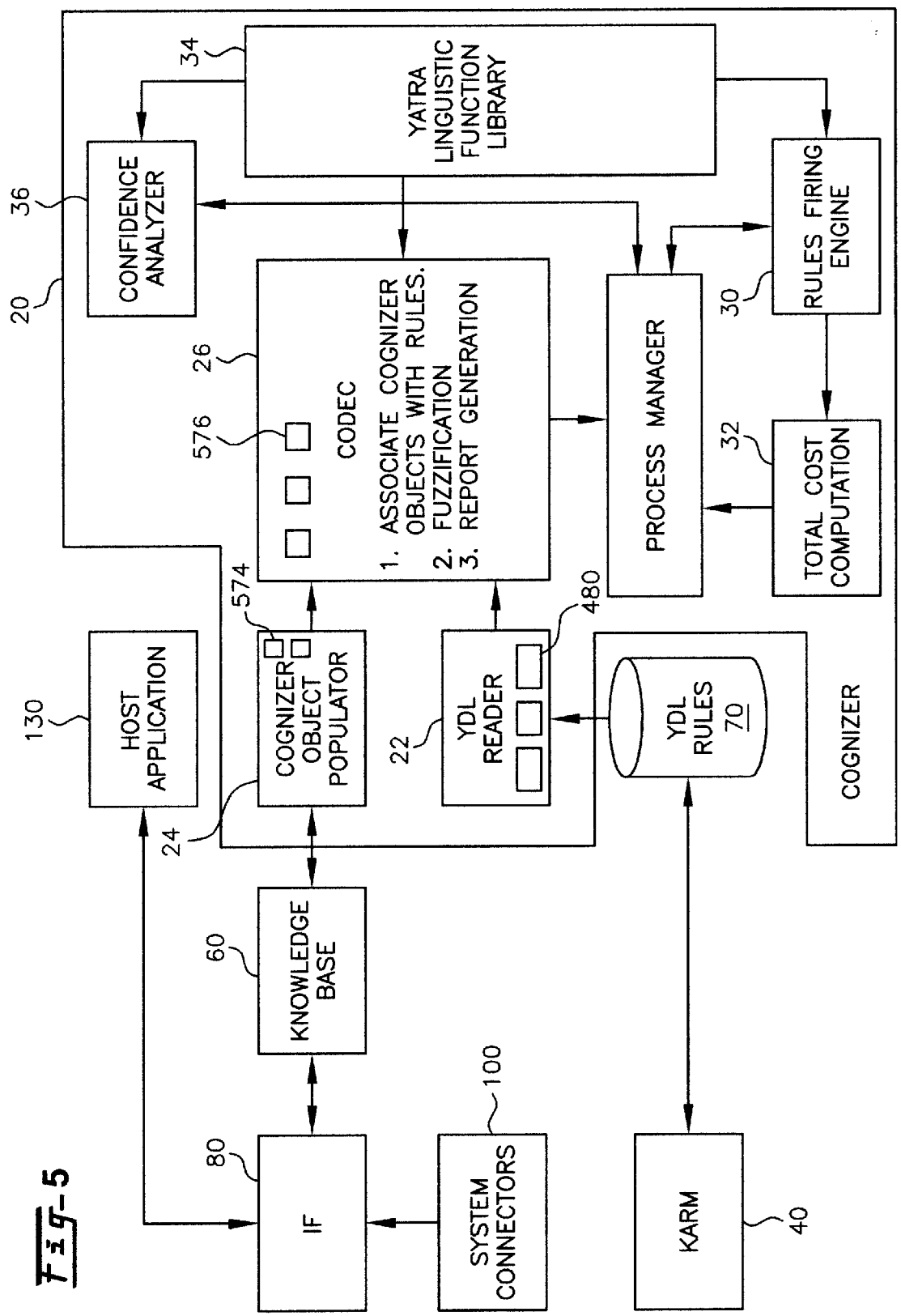
FIG. 5 is a diagram generally illustrating an example of a cognizer of the present invention.

Now referring to FIG. 5, FIG. 5 shows a block diagram of one embodiment of cognizer 20 in communication with rule base 70, knowledge base 60, and knowledge acquisition and rule manager 40. Cognizer 20 is a fuzzy-heuristic engine that calculates the TCOT for each travel event by using fuzzy logic algorithms to run knowledge base 60 information through rules 72 stored in rule base 70. Cognizer 20 comprises a plurality of modules that interact as follows. A process manager 28 performs the initialization and controls the execution of all cognizer 20 processes. An object populator 24 functions like an "object factory" to create and populate global objects 574 from data acquired from knowledge base 60. A YDL reader 22 compiles rules 72 and populates rules 72 into rule modules 480. A cognifier-decognifier (CODEC) 26 establishes the relationship between data objects 574 and rule modules 480 and fuzzifies all uncertain attributes of global objects 574 and rule modules 480. CODEC 26 interacts with a linguistic function library 34 to process the YDL output by knowledge acquisition and rule manager 40 in a series of fuzzy operations. A confidence analyzer 36 monitors various components of YDL reasoning. A rule firing engine 30 processes rules 72 and the results are supplied to a total cost computation module (TCCM) 32. TCCM 32 analyzes the total cost for all possible options and generates a report for the host application 130 via integration framework 80.

As mentioned above, an end user makes a travel request over host application 130, which integration framework 80 translates and hands to knowledge base 60. Knowledge base 60 then gathers relevant information from system connectors 100 via integration framework 80 and hands the travel request to cognizer 20. Process manager 28 initializes cognizer 20 by checking the integrity of rule base 70, confirming all the data sources, and initializing global objects 574 created by object populator 24.

Object populator 24 communicates with knowledge base 60 and CODEC 26 and manages the connection between knowledge base 60 and cognizer 20. Object populator 24 takes all the data collected from system connectors 100 and creates global objects 574 comprising MetaRules, RuleClusters, DataSimulation, HostIO, FuzzyLogic, TotalCost, DecisionNet, Diagnosis, and Learn. Further, object populator 24 maintains a mapping between the relational data of knowledge base 60 and global objects 574 to alleviate "impedance mismatch" between knowledge base 60 and cognizer 20. Process manager 28 initializes global objects 574, as stated above, and object populator 24 sends global objects 574 to CODEC 26 for further integration along with rule modules 480 sent by YDL reader 22.

Object populator 24 processes computer program steps according to the algorithm below.

Algorithm 2: Cognizer Object Populator

The Cognizer Object Populator follows the computer program algorithm below to instantiate and populate objects with current data upon the initiation of a travel optimization event (i.e. a query to a reservation database or inventory database). The initial query will take place from a Host Application such as a booking or reservation system.

1: Create high level classes of HostIO (to receive data from the Host Application) and DataObjects (to work with the Knowledge Base and other data sources).
2: Define required subclasses based upon business model, as defined through KARM. Examples of possible subclasses would include (Query, ContractInfo, HRCostInfo, PersonalPref, Report).
3: Query knowledge base and reservation system to instantiate and populate objects derived from classes DataObjects and HostApplication until population is complete or error occurs.
4: Conduct a consistency check to verify integrity of acquired data objects.
5: Redundancy analysis.
6: Send the populated objects to CODEC for preparation for the Cognizer Process Manager.

YDL reader 22 communicates with rule base 70 and CODEC 26 and advantageously preprocesses, compiles, and interprets rules 72 for further processing by CODEC 26. Preprocessing available rules 72 involves checking the availability of variables, operations, and other rule elements from the predefined lexicon of YDL, in a process called "lexical analysis." Compilation includes breaking rules 72 into different categories, such as, variable, operation, linguistic term, and linguistic modifiers. Interpretation establishes the relationships of rules 72 and global objects 574 and associates rules 72 inside rule clusters 480. Interpretation further requires checking the rule base 70 for redundant and contradictory rules 72. However, CODEC 26 advantageously handles a certain degree of contradiction through fuzzification. After interpretation, YDL reader 22 translates rules 72 into rule clusters 480 and sends rule clusters 480 to CODEC 26 for further integration along with global objects 574 sent by object populator 24, as stated above.

CODEC 26 communicates with object populator 24, YDL reader 22, linguistic function library 34, process manager 28, and rules firing engine 30 via process manager 28. CODEC 26 establishes the relationship between global objects 574 and rule modules 480 using cognification and decognification before sending the results to rules firing engine 30 via process manager 28.

The cognizer process manager processes computer program steps according to the algorithm below.

Algorithm 3: Cognizer Process Manager
1: Receive the required objects from the CODEC module. Uncertain quantities in the objects will already be fuzzified (see algorithm 5).
2: Select relevant rules clusters from the Rule Base dependent upon the objects received from the CODEC.
3: Finalize high level interrelationship between different rule clusters based upon query results and available data (i.e. which clusters are relevant, and how much should each cluster be weighted).

4: Create objects from the Rule Clusters to calculate the Total Cost of Travel. Example objects would include ContractCost, HRCost, and ConvenienceCost. A TotalCost object will also be created, to reflect different TotalCost functions for different individuals.
5: Send Created object and received data objects to the Rules Firing Engine, which will populate the objects with results based on the Fuzzy logic rules from the rule base.
6: Send the updated objects to the Total Cost Computation module for integration. Create a Report object to represent the results.
7: Acquire the Report Object, send to the CODEC for eventual display to the Host App and reporting applications (including KARM).

The fuzzy rule compiler and rule reader 22 processes computer program steps according to the algorithm below.
Algorithm 4: Fuzzy Rule Compiler and Rule Reader
1: Get current rule language syntax from resource file.
2: Conduct consistency check of acquired data
3: Specify lexical analysis operations.
4: Parse and define actions.
5: Create files with compiled language information.
6: Read all defined rules from the Rules Base.
7: Assign and create the required fuzzy functions for each defined Rule Cluster, based upon the acquired rules and the Yatra Linguistic Function Library.
8: Attach acquired rules to either the Rules Firing Engine 30 or Total Cost Computation 32 depending upon the Rule Cluster.

Cognification determines the fuzzy attributes of global objects 574 and translates global objects 574 into hybrid fuzzy objects 576; hence, cognification represents data from knowledge base 60 in terms of hybrid fuzzy objects 576. Cognification also creates a one to one relationship between fuzzy objects 576 and rule clusters 480. Associating fuzzy objects 576 with rule clusters 480 requires a sorting mechanism to filter out unnecessary fuzzy objects 576. Further, cognification "fuzzifies" the fuzzy objects 576.

Fuzzification finds the fuzzy or linguistic values of the hard or "crisp" quantities. Examples of crisp quantities include actual salary in dollars, discount in percentage, or fare in dollars, among others. Fuzzification then associates the set values of these crisp quantities with corresponding fuzzy values, such as, low, medium, and high, or any other graduated scale. Fuzzification acquires other information regarding the shape, size, and type of linguistic functions from knowledge acquisition and rule manager 40 in the form of Meta rules. Attaching the fuzzy values, such as low, medium, and high, to fuzzy objects 576 and associating the fuzzy objects 576 with corresponding rule clusters 480 completes cognification.

Cognification and fuzzification rely on a set of fuzzy membership functions, fuzzy operators, implication operators, aggregation operators, a fuzzification method, and an inference algorithm to interpret YDL and process and create hybrid fuzzy objects 576. Linguistic function library 34 communicates with confidence analyzer 36, rules firing engine 30 and CODEC 26 and provides the above listed elements for cognification and decognification.

The Cognizer implements computer program steps to perform the algorithm below for cognification and decognification.
Algorithm 5: CoDec: Cognification and Decognification module:
1: Get fuzzification information from Yatra Linguistic Function Library (information can include type, Shape Matrices and Meta Rules).
2: Acquire objects from Object Populator. Objects should already be populated with current data.
For each object:
3: Identify hard (non-fuzzy or discrete) quantities and uncertain quantities.
4: For each uncertain quantity select the appropriate fuzzification strategy from the Linguistic Function Library 34 and fuzzify the quantity.
5: Crisp quantities can remain untouched.

Fuzzy membership functions generate all fuzzy values for cognification and fuzzification. Fuzzy membership functions provide the theoretical framework for representing linguistic terms that are used for linguistic variables of fuzzy sets. These membership functions describe the shape and nature of the variable. Fuzzy membership functions include triangular, trapezoidal, S-shaped, bell shaped, Gaussian functions and Pi functions.

Figure 6:
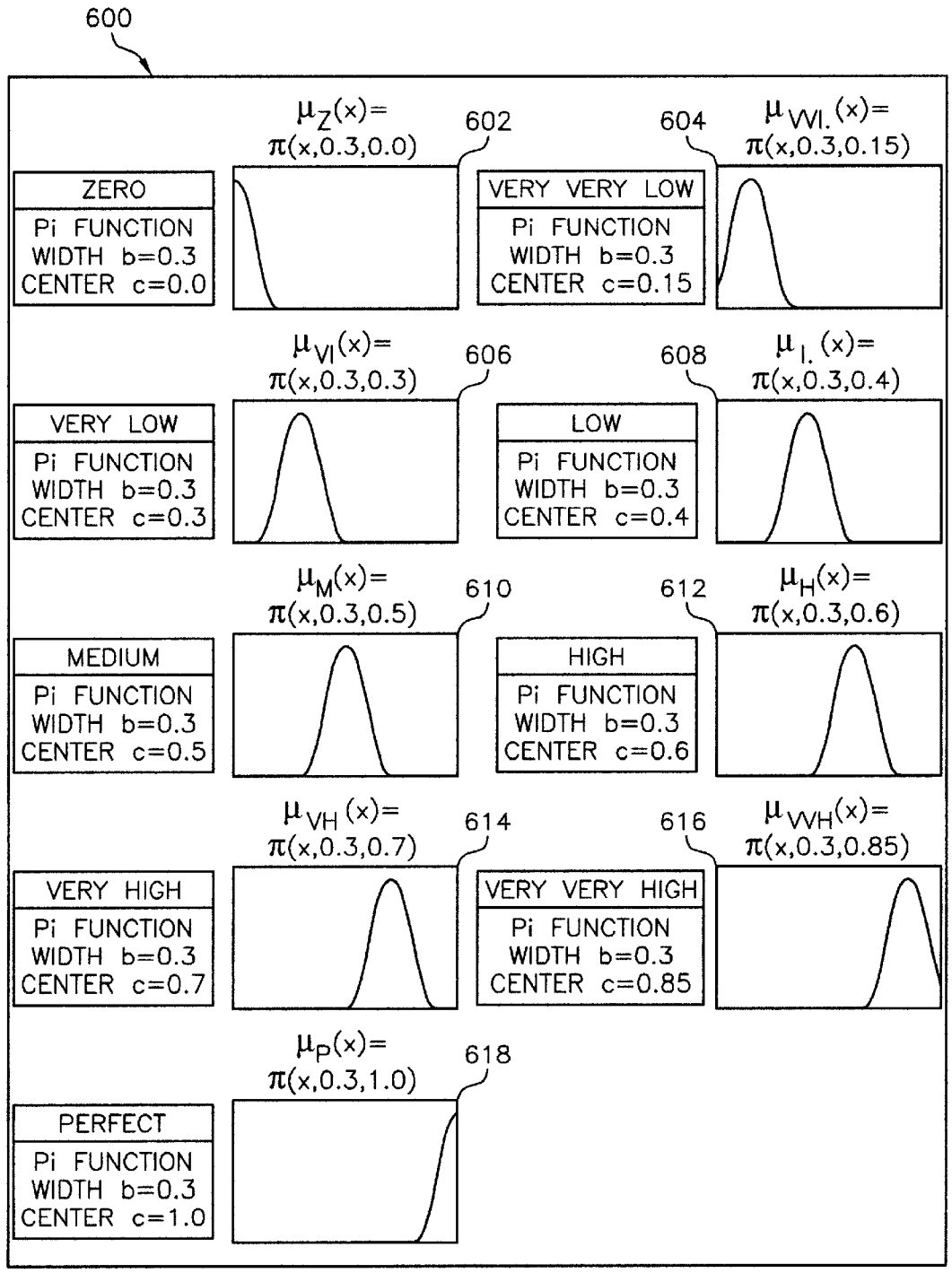
FIG. 6 shows a graphical representation illustrating examples of a fuzzy membership functions.

FIG. 6 shows an example of a fuzzy membership function. In particular, FIG. 6 shows a Pi function 600 describing a zero result 602, a very very low result 604, a very low result 606, a low result 608, a medium result 610, a high result 612, a very high result 614, a very very high result 616, and a perfect result 618.

Figure 7:
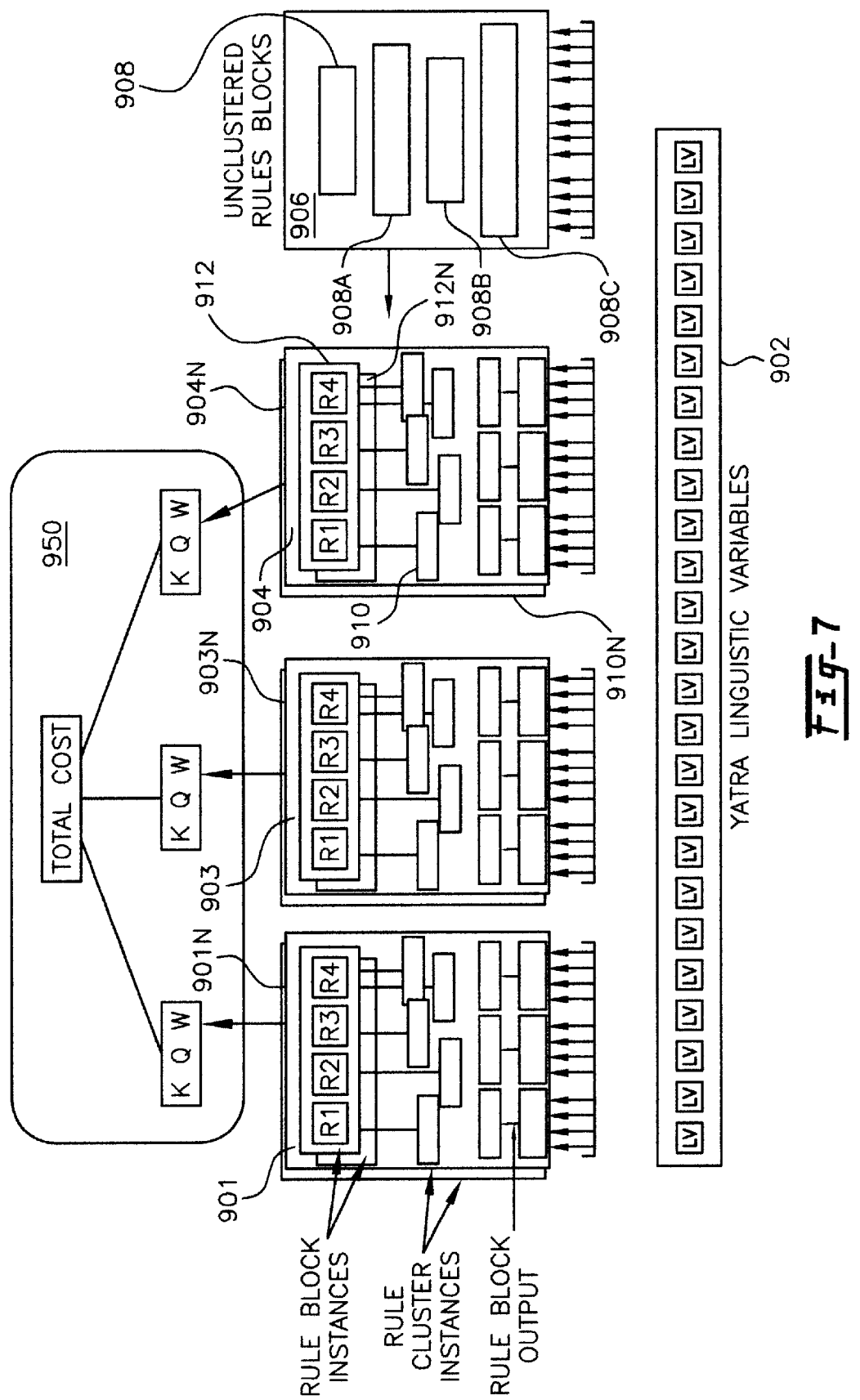
FIG. 7 shows a data flow block diagram of an example of a method for calculating a total cost of travel.

Referring now to FIG. 7, a data flow block diagram of a method of calculating a total cost of travel is shown. The method includes process blocks comprising information useful for calculating the total cost of travel 950. The blocks shown in the process include the linguistic variables 902, a plurality of cluster instances 901, 901N, 903, 903N, 904, 904N, and 906. Cluster 906 comprises a plurality of unclustered rule blocks 908A–908C. Further, the plurality of cluster instances 901, 901N, 903, 903N, 904,904N, and 906 represent a plurality of instances. Each of the plurality of instances corresponds to a set of rules that relates to a particular business group such as, marketing, engineering, sales, executives, or other divisions of labor within a company.

Each of the plurality of cluster instances includes a plurality of rule cluster instances 910, 910N and a plurality of rule blocks instances 912, 912N. Also shown is a process block for calculating the total cost of travel 950. The total cost travel 950 includes a plurality of inputs including K, Q and W, where K is a control parameter, Q is a cost quantity, W is a cost factor, such as a weighting factor.

In operation, linguistic variables 902 are transmitted to rule cluster instances in the plurality of cluster instances to form rule block instances. Unclustered rule blocks are shared by other cluster instances as is appropriate to the rules being generated in accordance with corporate policy. The rule block may comprise a template including a set of rules that applies to a specific group of employees, as for example, marketing, engineering, sales, executives, or other divisions of labor within a company. The group of rules with the same linguistic variable in the conclusion is a rule block. For example, multiple rules may be used to determine tweaking of negotiated discounts. All rules relating to a negotiated discount may be considered as a rule block.

Figure 8:
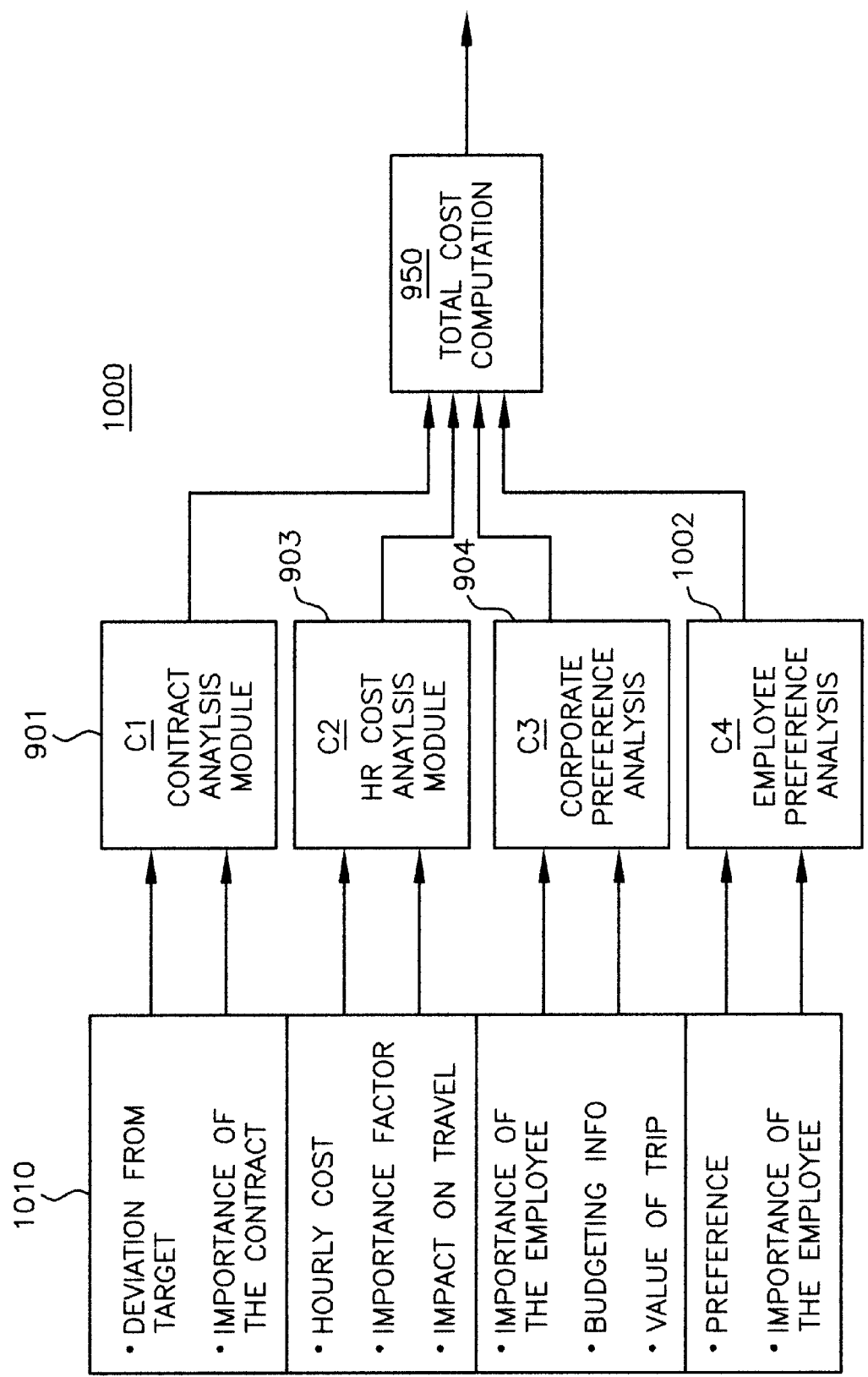
FIG. 8 shows a block diagram of one example of a rule cluster instance.

Now referring to FIG. 8, a block diagram of a rule cluster instance 1000 is shown. The rule cluster instance 1000 includes a plurality of linguistic variable examples 1010, a plurality of clusters 901, 903, 904 and 1002. In this example, linguistic variables used as inputs to cluster 901 include "deviation from target" and "importance of the contract". Cluster 901 is a contract analysis module in this example. Cluster 903 is a human resources (HR) analysis module and receives linguistic variable inputs "hourly costs," "importance factor," and "impact on travel". Cluster 904 is a corporate preference analysis module than receives linguistic variable inputs "importance of the employee," "budgeting information," and "value of trip". Cluster 1002 receives linguistic variable inputs "preference," and "importance of the employee. Each of the clusters formulate rules and rule blocks that are then transmitted to the total cost computation 950.

Referring now to FIGS. 9A–9F, several examples of linguistic functions that may be employed by the method of the invention are shown together with their function types, equations, linguistic term modifiers and linguistic function graphs.

FIG. 9A shows a triangular symmetrical function having the relationship $$\mu_{\Delta s}(x, \chi, \beta) = \begin{cases} 1 - 2 * \left(\frac{|x - \chi|}{\beta}\right) & \chi - \beta/2 \leq x \leq \chi + \beta/2 \\ 0 & \text{otherwise} \end{cases}$$

Linguistic term modifiers appropriately described by the function shown in FIG. 11a include "Zero," "Very," "Low," "Medium," "High," "Very High," and "Perfect."

The functions and variables for each of the other examples may be interpreted similarly from FIGS. 9A–9F. As will be understood by those skilled in the art, having the benefit of this disclosure, the variables denote the scope and central value of the linguistic term.

All fuzzy values are generated by means of a fuzzy membership function. Fuzzy membership functions provide the theoretical framework for representing linguistic terms that are used for linguistic variables of fuzzy sets. These membership functions describe the shape and nature of the variable. The typical set of fuzzy membership functions to be included in the YATRA TPOS is triangular, Trapezoidal, S-Shaped, Bell Shaped and Gaussian functions.

Fuzzy Operators complete the relation between two or more fuzzy quantities. The basic types of operator functions are union and intersection. Union and intersection operators represent two loosely defined extreme decision categories in fuzzy reasoning, known as fuzzy t-norms and fuzzy t-conorms. They are also called most optimistic or most pessimistic type of operators. Fuzzy logic provides a number of mathematical operators for t-norms and t-conorms between union and intersection operations. The typical set of fuzzy operators used for decision support and rule processing are Yager, Zadeh, Mamdani, Sugeno, and Lukaciewiez.

Implication operators are used for fuzzy implication or rule firing process. Fuzzy implication is a mechanism for generalized inference applicable to a chain of conditional propositions, including the association between premise and conclusion. Basic implication operators are Mamdani, Larsen, Godelian, Bounded, and Drastic Products.

Aggregation operators are used to combine different rules 72. Outputs of two rules 72 are combined in a way to satisfy the relation specified between the rules 72. These relational operators can be of union and intersection types or from the variety of intermediate operators, such as, weighted aggregated mean (WAM). Linguistic function library 34 uses five aggregation operators: Yager Union, Intersection, WAM, Weighted Generalized Mean and Gamma operators.

The fuzzification method converts a variable in a defined domain to a domain of fuzzy discourse that is confined to [0,1]. For one given input, a set of fuzzy membership values is calculated. In other words, for all linguistic terms, the fuzzification method computes a corresponding membership value. The fuzzification method depends upon the defined Meta rules of the linguistic variable generated by fuzzy membership functions. Fuzzification outputs the results of these membership functions. As detailed below, an inference algorithm implemented by the rules firing engine processes the calculation from the fuzzification method in combination with fuzzy operators and implication operators. The inference algorithm outputs a fuzzy conclusion that is used in the defuzzification process.

Again referring to FIG. 5, confidence analyzer 36 communicates with process manager 28 and linguistic function library 34 and monitors various processes of linguistic function library 34 using various fuzzy measures of plausibility, belief, and correctness. Monitoring includes error handling and signaling of invalid rules and parameters. Further, confidence analyzer 36 prepares for any eventual error situation, so that an immediate action can be taken. Fuzzy logic can handle conflicting situations only at a certain confidence and if that confidence level is not achieved a warning message for rule tuning is issued to knowledge acquisition and rule manager 40. The threshold value for the confidence is specified through Meta knowledge acquisition in knowledge acquisition and rule manager 40.

Additionally, confidence analyzer 36 develops a set of belief and confidence measures that assess the level of accuracy and correctness of the TCOT calculation. Fuzzy logic provides mathematical measures to estimate the fuzziness or ambiguity of various fuzzy logic rules, variables, and linguistic terms. The measure of fuzziness specifies the level of confidence using a certain membership function and fuzzy operators in the given situation. Fuzzy entropy and other measures of uncertainty estimate the amount of fluctuations and firing success of rules 72. A belief measure in fuzzy logic is a function that satisfies the basic conditions of fuzzy reasoning. A threshold value below the belief measure is not used for the TCOT calculation.

After completing cognification, CODEC 26 begins decognification. Decognification generates reports of cognification results. Decognification analyzes results from cognification and builds a confidence matrix. Based on the confidence matrix, a list of final decisions is generated, such as, a list of flight options with the fare available in the requirement time window. Decognification sends archiving information to rule base 70 if changes are required; however, problems of contradicting results and confusing outputs can only be handled during the knowledge acquisition process and rule building stage of travel purchasing optimization system. Decognification sends the results to rules firing engine 30 for analyses.

Rules firing engine 30 communicates with process manager 28 and TCCM 32. Rules firing engine 30 processes rule clusters 480 and hybrid fuzzy objects 576 output by CODEC 26 to calculate various weights and factors for TCCM 32. The rule firing process partitions rule clusters 480 into different inferencing instances by selecting a rule line or a rule point of the fuzzy membership function. Inferencing requires a pre-defined inferencing algorithm for each rule cluster 480 depending upon the fuzzy relation between rule clusters 480. Inferencing should be as generic as possible, so that a newly introduced rule cluster 480 and new variables do not require substantial changes in the inferencing algorithms. Rules firing engine 30 outputs a set of weights (w) to TCCM 32.

The rules firing engine 30 implements the following inferencing algorithm in a computer processor or the like.

Algorithm 6: Rule Firing Engine Inferencing Algorithm
1. Get the cognified objects from CODEC.
2. Combine the fuzzified inputs to complete the premise operation of the rule.
3. Use the appropriate implication operator to transfer the premise membership value to the conclusion part of the rule.
4. Using the membership functions of the output of the rule and the conclusion membership a truncated rule is selected.
5. If more rules are available from the rule block, then go back to step 2 and repeat through this step.
6. Combine the selected rules.
7. Get the defuzzified output for the rule block.
8. If more rule blocks then repeat from step 2, otherwise send the defuzzified output of the last and most significant rule block from the current cluster to Total cost computation module 32.

Total cost computation module 32 communicates with process manager 28 and rules firing engine 30 and calculates the TCOT. TCCM 32 computes the TCOT by plugging the calculated weights (w), from rules firing engine 30, into the formula given above in algorithm 7. Cognizer 20 then returns the TCOT calculation, via integration framework 80, to host application 130 where the end user receives the information. The end user may then make another travel request based on another travel event.

Total cost computation module 32 implements the following algorithm in a computer or the like.
Algorithm 7: Total Cost Computation
1. a) Get all the weights from the Rules Firing Engine, corresponding to the rule clusters from 1 to N.
   b) Get the quantities of Pricing and controlling parameters $K_i$ for fare and other clusters i=1, N.
2. Calculate the total cost of travel according to the formula:

$$T_{Cost} = \sum_{i=1}^{N} K_i w_i Q_i$$

where, K=Normalizing Constant, w=weight set, and Q=Quantity being weighted (fare, discount, risk, salary, etc.).
3. Send the TCOT to Cognizer Process Manager.

Confidence analyzer 36 develops a set of belief and confidence measures that assess the level of accuracy and correctness of the TCOT calculation by executing program steps in accordance with the following algorithm 8.
Algorithm 8 Confidence Analyzer
1. Create/Initialize performance measuring factors including rule-belief, rule-impact, and rule-redundancy.
2. Report Error with proper error handling for all stages of rule processing and total cost computation.
3. Ensure quality and robustness with proper exception handling.
4. Store intermediate results of rules, rule-blocks and cluster levels.
5. Estimate the relative rule-belief with stored results with standard fuzzy methods.
6. Compute the rule-impact in terms of US Dollars.
7. Aggregate the rule-worth, rule-block-worth and cluster-worth from the values of stages 5 and 6.
8. Compare the performance with the stored results from a Data/Rule Archive (data mart).
9. Report the results to the Cognizer Process Manager.
The following definitions apply to the above algorithm 8.
"rule-belief"

Any measure which represents the grade of accuracy of the computation with the given data. Rule-belief may be expressed as a function of membership values and the rule parameters.
"rule-impact":
Any measure which represents the grade of satisfaction for fulfilling the rule motive. Rule-impact may be expressed as a function of membership values with feedback from rule testing.
"rule-redundancy":
Any measure used to decide the inclusion or removal of rules or changing the grade of importance of the rules. Rule-redundancy may be expressed as a function of rule-impact and rule-belief.
"proper error handling":
Proper error handling means a robust error handling of all erroneous situations. Note: It should not disappear with blank screen. It should give a proper message and undertake a corresponding action if possible.
"proper exception handling":
An action in, for example, a specific case of error handling. The exceptional situations can be foreseen and should be handled correctly, like division by zero.
"rule-worth":
Rule weight after the testing period is over.
"rule-block-worth":
Aggregation of rule weights for a rule block.
"cluster-worth":
Aggregation of rule weights from the whole cluster.

Rule manager 46 allows users, or programmers, to rapidly create, examine, and fine tune rules 72 using pure YDL through the rule manager 46 interface by executing program steps in accordance with the following algorithm 9.
Algorithm 9 Rule Fine Tuning
1. Acquire the Performance measures from the Cognizer Process Manager.
2. Change the Meta knowledge of the YDL Rules in small steps.
3. Observe the Performance measurements and go to 2 until a significant change takes place up to a threshold value.
4. a) In case of no significant change, register "no change flag" for a particular rule, rule block or cluster.
   b) In case of a change in the Rule, Rule-Block or Cluster, report the corresponding changes to KARM module.
5. If changes are frequent and irregular, then transmit corresponding warning messages to KARM Module.
6. Adapt the fuzzy function library according to the regular changes by tuning the variables and/or weights.

Figure 10:
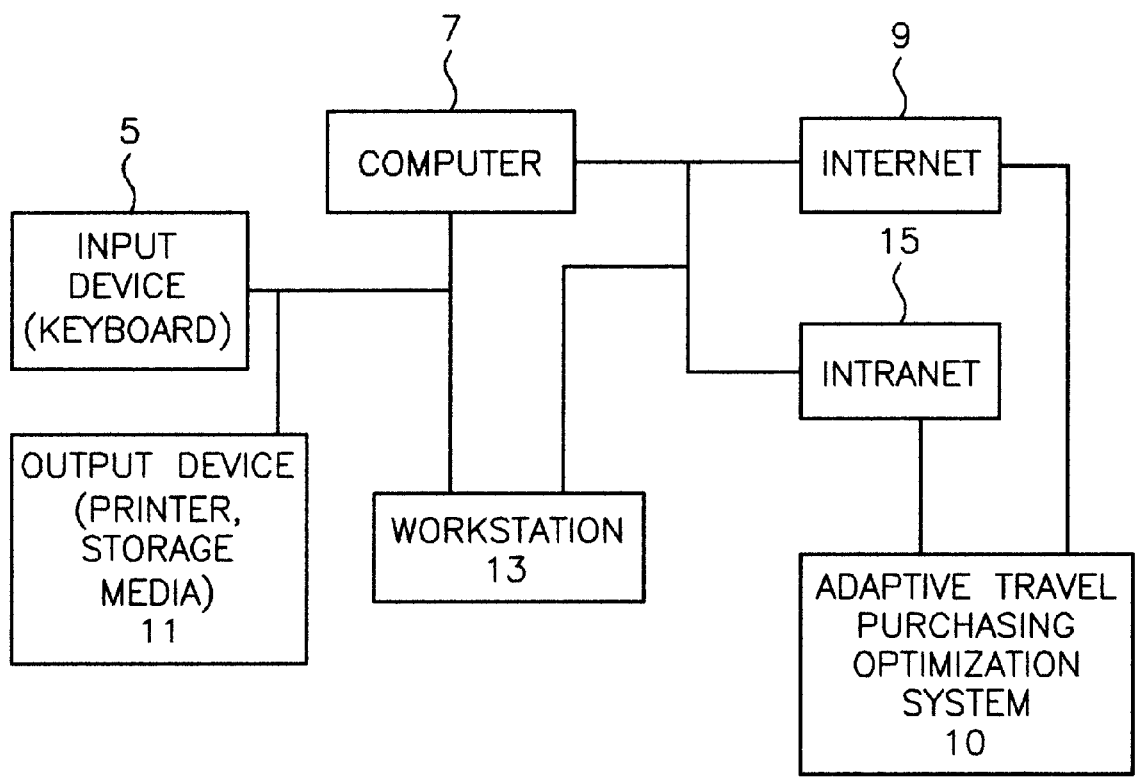
FIG. 10 is a high level block diagram of a travel optimization system network as may be employed in one example of the invention.

Referring now to FIG. 10, an example showing a high level block diagram of a travel optimization system network as may be employed is shown. The travel optimization system network comprises a computer 7, or optionally a workstation 13 or equivalent computing system, having an input device 5 and an output device 11. The computer 7 or workstation 13 is accessed through the input device 5, for example a computer keyboard. A user thus enters a travel request or query. The travel request or query is then transmitted through standard Internet 9 or intranet 15 communication lines to the adaptive travel purchasing optimization system 10. The output device may be a printer or storage device for printing or storing travel choices and other data. The computer, workstation, internet, intranet and input/output devices may all comprise conventionally available equipment and facilities. The internet 9 represents the well known information superhighway comprising a world wide web of computers around the world that share data.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment and devices, and that various modifications, both as to the equipment details and operating procedures, may be accomplished without departing from the true spirit and scope of the present invention.

What is claimed is:

1. A computer-implemented travel purchasing optimization system (TPOS) for providing choices for business travel in response to queries, wherein the choices are based on a computation of a total cost of travel, the system comprises:

a cognizer in communication with a knowledge base, a rule base and a knowledge acquisition and rule manager (KARM), wherein said knowledge acquisition and rule manager creates rules, including fuzzy logic rules, for said rule base using a rule modeling language, and further wherein, an external booking system transmits a travel request to an integration framework in communication with said knowledge base, and said integration framework collects data from a plurality of system connectors, and further wherein, said cognizer processes said rules, including said fuzzy logic rules, from said rule base with the data from said knowledge base so as to determine a total cost of travel in response to the travel request.

2. The computer-implemented travel purchasing optimization system of claim 1 wherein the rule modeling language comprises an adaptive rule modeling language.

3. The computer-implemented travel purchasing optimization system of claim 1 wherein said knowledge acquisition and rule manager further comprises:

(a) a rule manager for creating and managing said rules based on a plurality of preferences;

(b) a rule writer in communication with said rule manager and said rule base for creating and managing said rules based on said rule modeling language;

(c) a rule tester in communication with said rule manager, said rule writer, and said rule base for testing said rules; and (d) a rule analyzer in communication with said rule manager, said rule tester, and said knowledge base for analyzing said rules.

4. The travel purchasing optimization system of claim 1 wherein said rule modeling language further comprises:

(a) a terminal vocabulary;
(b) a non-terminal vocabulary;
(c) a plurality of production rules;
(d) a starting symbol;
(e) a meta terminal vocabulary;
(f) a meta non-terminal vocabulary;
(g) a plurality of meta rules; and
(h) a meta starting symbol wherein said language components (a)–(h) combine to form adaptive rules.

5. The computer-implemented travel purchasing optimization system of claim 1 wherein said rule base comprises:

(a) at least one rule block comprising a plurality of said rules for processing data; and (b) a plurality of clusters, each of the plurality of clusters comprising at least one rule block for processing data.

6. The computer-implemented travel purchasing optimization system of claim 1 wherein said system connectors further comprise:

(a) a corporate preference editor in communication with said integration framework for providing travel preferences of the corporation;

(b) an employee preference editor in communication with said integration framework for providing travel preferences of the employee;

(c) a special pricing database for providing corporate contract information; and (d) a plurality of external databases including human resources profiles, computer reservation systems, and custom applications.

7. The travel purchasing optimization system of claim 1 wherein said cognizer further comprises:

(a) a reader in communication with said rule base for reading and compiling said rule modules and said core modules;

(b) an object populator in communication with said knowledge base for creating a plurality of global objects;

(c) a cognifier/decognifier (CODEC) in communication with said object populator and said YDL reader for relating said rule modules and said global objects;

(d) a linguistic function library in communication with said CODEC for supplying fuzzy logic functions to said CODEC;

(e) a confidence analyzer in communication with said linguistic function library for testing and monitoring said linguistic function library;

(f) a process manager in communication with said CODEC and said confidence analyzer for managing said cognizer and initializing said CODEC and said global objects;

(g) a rules firing engine in communication with said process manager for creating a plurality of weight sets for said rule clusters; and (h) a total cost computation module in communication with said rules firing engine and said process manager for calculating the total cost of travel.

8. The travel purchasing optimization system of claim 1 wherein said travel purchasing optimization system further comprises a data mart in communication with said knowledge acquisition and rule manager for creating and archiving travel purchasing optimization system data.

9. A method of travel purchase optimization comprising the steps of:

(a) creating a plurality of rules, including fuzzy rules, using a knowledge acquisition and rule manager (KARM);

(b) receiving data related to a travel request;

(c) calculating a total cost of travel by applying the plurality of rules to the received data; and (d) interfacing with an external booking system using an application program interface in communication with said integration framework.

10. The method of claim 9 further comprising the steps of:

a) receiving said received data through a plurality of system connectors;

b) compiling the received data using an integration framework in communication with said system connectors; and c) storing said received data in a knowledge base in communication with said integration framework.

11. The method of claim of claim 9 wherein the step of creating rules using said knowledge acquisition and rule manager further comprises the steps of:
(a) creating said rules based on a plurality of preferences using a rule manager;
(b) writing said rules in a rule modeling language using a rule writer in communication with said rule base;
(c) testing said rules using a rule tester in communication with said rule manager, said rule writer, and said rule base; and
(d) analyzing said rules using a rule analyzer in communication with said rule manager, said rule tester, and said knowledge base.

12. The computer-implemented travel purchasing optimization system of claim 11 wherein the rule modeling language comprises an adaptive rule modeling language.

13. The travel purchasing optimization system of claim 11 wherein writing said rules in said rule modeling language using a rule manager further comprises the steps of:
(a) coding a terminal vocabulary;
(b) coding a nonterminal vocabulary;
(c) coding a plurality of production rules;
(d) coding a starting symbol;
(e) coding meta terminal vocabulary;
(f) coding a meta non-terminal vocabulary;
(g) coding a plurality of meta rules; and
(h) coding a meta starting symbol.

14. The travel purchasing optimization system of claim 9 further comprising the steps of:
a) storing said rules in said knowledge base;
b) coding at least one rule block, each comprising a plurality of said rules; and
c) coding a plurality of clusters each comprising at least one of said rule blocks.

15. The travel purchasing optimization system of claim 10 wherein using said system connectors comprises the steps of:
(a) connecting to a special pricing database to provide corporate contract information; and
(b) connecting to a plurality of external databases to provide human resource profiles, flight and fare information, and financial data.

16. The travel purchasing optimization system of claim 9 wherein the step of creating a plurality of rules further comprises the steps of:
a) connecting to a corporate preference editor to provide travel preferences of the corporation;
b) connecting to an employee preference editor to provide travel preferences of the employee; and
c) translating said corporation and employee preferences into a rule modeling language.

17. The travel purchasing optimization system of claim 9 wherein calculating the total cost of travel further comprises the steps of:
(a) using said cognizer for reading said plurality of rule blocks and said clusters using a descriptive language reader in communication with said rule base;
(b) compiling said rule modules and! said core modules using a descriptive language reader in communication with said rule base;
(c) creating a plurality of global objects using an object populator in communication with said knowledge base;
(d) relating said rule modules and said global objects using a cognifier/decognifier (CODEC) in communication with said object populator and said descriptive language reader;
(e) supplying fuzzy logic functions to said CODEC using a linguistic function library to in communication with said CODEC;
(f) monitoring said linguistic function library using a confidence analyzer in communication with said linguistic function library;
(g) managing said cognizer using a process manager;
(h) initializing said CODEC and said global objects using said process manager in communication with said CODEC and said confidence analyzer;
(i) creating a plurality of weight sets for said rule modules using a rules firing engine in communication with said process manager; and
(j) calculating the total cost of travel using a total cost computation module in communication with said rules firing engine and said process manager.

18. The method of travel purchase optimization of claim 17 further comprising the step of archiving information in a data mart in communication with said knowledge acquisition and rule manager.

* * * * *